United States Patent
Aoba et al.

(10) Patent No.: US 8,215,724 B2
(45) Date of Patent: Jul. 10, 2012

(54) PRESSURE REGULATING RESERVOIR

(75) Inventors: Koji Aoba, Kariya (JP); Kazuma Shigeta, Kariya (JP); Tomoo Harada, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 445 days.

(21) Appl. No.: 12/546,346

(22) Filed: Aug. 24, 2009

(65) Prior Publication Data

US 2010/0052417 A1 Mar. 4, 2010

(30) Foreign Application Priority Data

Aug. 28, 2008 (JP) ................................ 2008-219835
May 29, 2009 (JP) ................................ 2009-130425

(51) Int. Cl.
*B60T 8/42* (2006.01)
(52) U.S. Cl. .......... 303/115.4; 303/DIG. 11; 303/115.1; 138/31
(58) Field of Classification Search ............... 303/113.2, 303/115.4, 15.1, 114.1, 119.2, 87, DIG. 11; 92/96; 137/596.17, 614.14; 251/315.01; 138/30, 31
See application file for complete search history.

(56) References Cited

U.S. PATENT DOCUMENTS

| | | | | |
|---|---|---|---|---|
| 4,703,979 A | * | 11/1987 | Nakanishi et al. | 303/116.1 |
| 5,584,539 A | * | 12/1996 | Hashida | 303/113.2 |
| 5,947,566 A | * | 9/1999 | Tobisawa et al. | 303/114.1 |
| 6,302,498 B1 | * | 10/2001 | Ariki et al. | 303/115.4 |
| 6,550,872 B1 | * | 4/2003 | Caldwell | 303/84.2 |
| 6,910,745 B2 | * | 6/2005 | Inage et al. | 303/115.4 |
| 7,543,896 B2 | * | 6/2009 | Ariki et al. | 303/115.4 |
| 2006/0091725 A1 | | 5/2006 | Ariki et al. | |
| 2009/0152941 A1 | | 6/2009 | Isono et al. | |

FOREIGN PATENT DOCUMENTS

| | | |
|---|---|---|
| EP | 2 022 690 A1 | 2/2009 |
| JP | 2006-151362 A | 6/2006 |
| JP | 2008-007080 A | 1/2008 |

\* cited by examiner

*Primary Examiner* — Bradley King
*Assistant Examiner* — Thomas Irvin
(74) *Attorney, Agent, or Firm* — Buchanan Ingersoll & Rooney PC

(57) ABSTRACT

A pressure regulating reservoir includes, first and second conduits, a reservoir chamber, first and second reservoir ports, a valve portion including a first hydraulic passage, first and second valve bodies, and a valve seat including a second hydraulic passage, a piston portion including a piston and a spring, a mobile member, a protruding portion and a shaft, wherein the first hydraulic passage is closed by the second valve body thereby interrupting the fluid communication when the pump is not actuated, a pressure difference between a brake hydraulic pressure within the reservoir chamber and a brake hydraulic pressure within the first reservoir port is regulated when the pump is actuated while the brake hydraulic pressure is generated by the brake hydraulic pressure generating means, and the second hydraulic passage is opened to establish the fluid communication when the pump is actuated while no brake hydraulic pressure is generated.

20 Claims, 12 Drawing Sheets

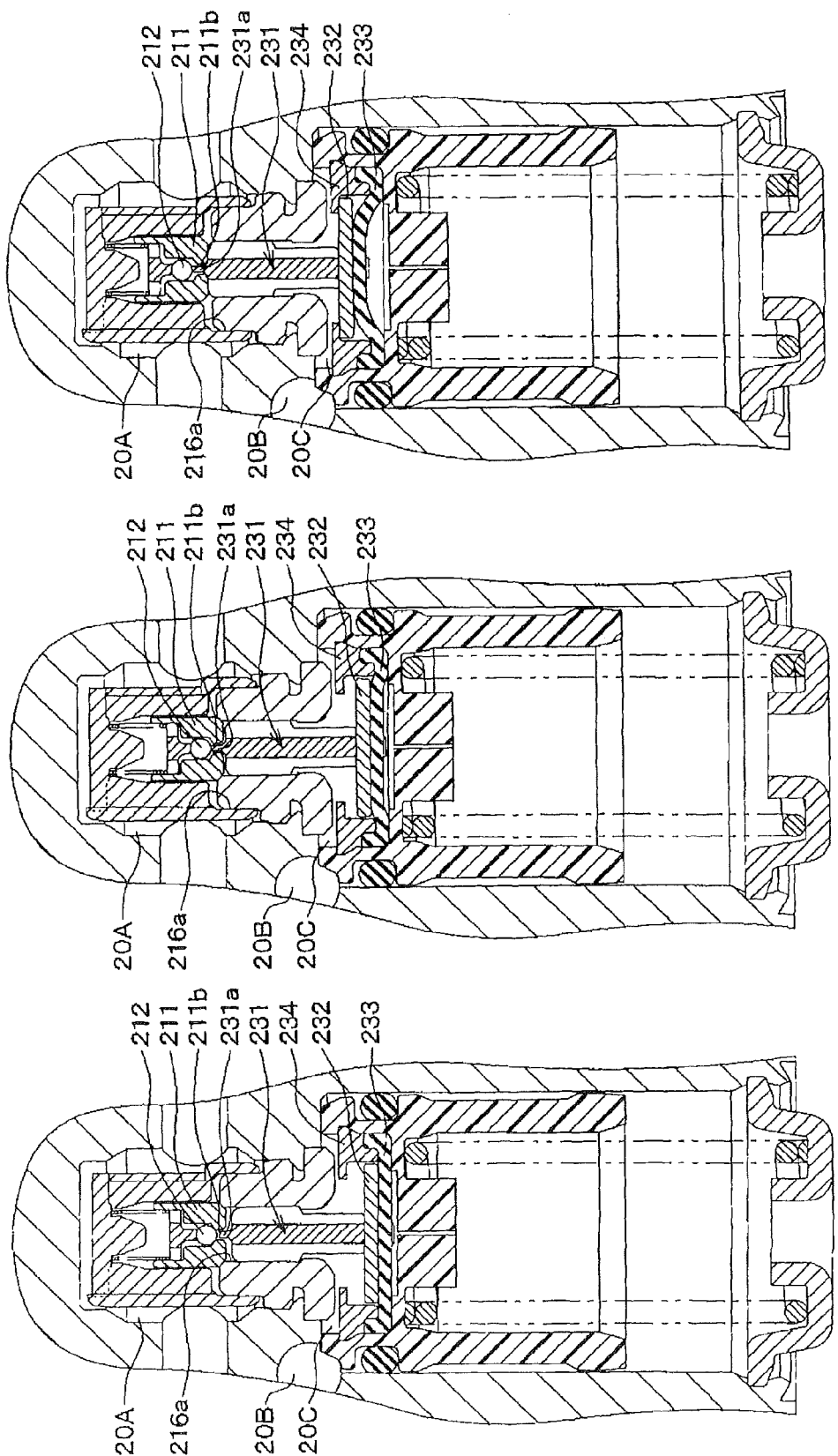

PRESSURE REGULATING RESERVOIR

CROSS REFERENCE TO RELATED APPLICATIONS

This application is based on and claims priority under 35 U.S.C. §119 to Japanese Patent Application 2008-219835, filed on Aug. 28, 2008, and Japanese Patent Application 2009-130425, filed on May 29, 2009, the entire contents of which are incorporated herein by reference.

TECHNICAL FIELD

The present invention relates to a pressure regulating reservoir. More specifically, the present invention pertains to a pressure regulating reservoir to which a brake fluid within a wheel cylinder flows in a case where a brake hydraulic pressure control is executed.

BACKGROUND

Disclosed in JP2006-151362A is a brake apparatus for a vehicle that executes an anti-skid control (ABS control) by using a pressure regulating reservoir (a switch reservoir). Illustrated in FIG. 12 is a cross-sectional diagram of the pressure regulating reservoir disclosed in JP2006-151362A.

The pressure regulating reservoir illustrated in FIG. 12 is configured so that a major diameter portion 101a of a shaft 101, which is press-fitted into a piston 100, contacts a lower surface 102a of a valve seat 102, and so that an upper surface 100a of the piston 100 does not contact an upper end surface 105 of a wall surface defining a reservoir chamber 104 within a housing 103. Therefore, a lifting degree (lifting) of a ball valve 106 may be determined on the basis of only a size of an upper portion of the shaft 101 other than the major diameter portion 101a thereof, which contacts the lower surface 102a of the valve seat 102, i.e. on the basis of only a size of a minor diameter portion 101b of the shaft 101 in an axial direction thereof.

According to the pressure regulating reservoir disclosed in JP2006-151362A, the shaft 101, which is press-fitted into the piston 100, is upwardly pushed in FIG. 12 by an elastic force generated by a spring 109 while a normal brake operation is performed (e.g. while a brake hydraulic pressure control such as an anti-skid control (ABS control) and the like is not executed). Accordingly, the ball valve 106 is disengaged from the valve seat 102, thereby establishing a valve opened state. When the brake hydraulic pressure control is executed subsequently and a predetermined amount of a brake fluid flows into the reservoir chamber 104, the shaft 101 is downwardly displaced in FIG. 12 together with the piston 100, therefore, the ball valve 106 contacts the valve seat 102. Accordingly, the brake fluid may be prevented from flowing into the reservoir chamber 104 in order to prevent the piston 100 from reaching a bottom dead point (i.e. a bottom end point in a distance where the piston 100 is displaceable).

However, according to the pressure regulating reservoir disclosed in JP2006-151362A, when a brake hydraulic pressure is applied to a reservoir port 108, i.e. an upper portion of the pressure regulating reservoir relative to the valve seat 102 in FIG. 12, the shaft 101, which contacts the ball valve 106, and the piston 100 are pushed down, so that the pressure regulating reservoir turns to be in a valve closed state from the valve opened state. Therefore, generally, a certain amount of the brake fluid needs to be applied to the pressure regulating reservoir in order to turn the pressure regulating reservoir to be in the valve closed state when the brake operation is performed, while the brake fluid is also supplied to wheel cylinders. Therefore, a brake feeling may deteriorate because the brake fluid is also supplied to the pressure regulating reservoir in addition to the wheel cylinders.

Disclosed in JP2008-7080A is a pressure regulating reservoir, which is configured as a normally closed valve, in order to prevent a brake fluid from flowing into a reservoir chamber from a master cylinder when a brake operation is started, while ensuring a pressure regulating function of the pressure regulating reservoir.

Generally, there exists a need for reducing a deterioration of the brake feeling, which is caused because the brake fluids is also used at the pressure regulating reservoir, and for improving a responsiveness of the brake hydraulic pressure control.

For example, referring to FIG. 12, a balance between the brake hydraulic pressure and an internal pressure of the reservoir chamber 104 (which will be hereinafter referred to as a reservoir internal pressure) is determined on the basis of a relationship between a force for pressing down the piston 100 together with the shaft 101 (i.e. a seat diameter (an internal diameter of the valve seat 102)* the brake hydraulic pressure) and a force for pressing up the piston 100 together with the shaft 101 (i.e. the reservoir internal pressure (which corresponds to an intake negative pressure generated by a pump)* a piston diameter). In order to turn the pressure regulating reservoir to be in the valve opened state while the normal barking operation is performed, a relationship "reservoir internal pressure*piston diameter>seat diameter*brake hydraulic pressure" needs to be satisfied. Therefore, the seat diameter is limited to be enlarged. However, in order to flow the brake fluid into the reservoir chamber 104 by a suction of the pump so that the ball valve 106 and the valve seat 102 are pushed up to a point where the lifting degree of the ball valve 106 and the seat valve 102 of the pressure regulating reservoir reaches the maximum (i.e. a valve fully-opened state), an intake diameter of the pressure regulating reservoir needs to be enlarged. Furthermore, in order to improve the responsiveness of the brake hydraulic pressure control especially when the brake operation is performed under a cold temperature circumstance such as a circumstance where viscosity of the brake fluid increases, a size of the pressure regulating reservoir needs to be enlarged.

A need thus exists to provide a pressure regulating reservoir which is not susceptible to the drawback mentioned above.

SUMMARY OF THE INVENTION

According to an aspect of the present invention, a pressure regulating reservoir includes a housing, a first conduit provided at the housing and connecting a main conduit and the pressure regulating reservoir, the main conduit connecting a brake hydraulic pressure generating means for generating a brake hydraulic pressure in response to an operation of a brake operation member and a wheel braking force generating means for generating a braking force relative to a wheel, a second conduit provided at the housing and connecting the main conduit and the pressure regulating reservoir in order to allow the brake hydraulic pressure to be transmitted from the brake hydraulic pressure generating means to the pressure regulating reservoir through the second conduit, a reservoir chamber formed at the housing, connected to the first conduit and the second conduit, storing therein a brake fluid, and connected to an inlet port of a pump for sucking the brake fluid stored within the reservoir chamber, a first reservoir port connecting the reservoir chamber and the second conduit, a second reservoir port connecting the reservoir chamber and the first conduit, a valve portion provided at the first reservoir port and including a first hydraulic passage for allowing the brake fluid to flow therethrough from the second conduit to the reservoir chamber, a first valve body, a second valve body for closing the first hydraulic passage and a valve seat at which a second hydraulic passage, which has a larger passage area than the first hydraulic passage and which is to be closed by the first valve body, is formed, a piston portion including a piston for changing a volume of the reservoir chamber and a spring, which is disposed at the piston portion at a portion opposite from the reservoir chamber relative to the piston so as to bias the piston in a direction of reducing the volume of the reservoir chamber, a mobile member being displaceable in response to a pressure difference generated between the reservoir chamber and an opposing chamber, which is positioned so as to be opposite to the reservoir chamber relative to the piston, in order to change a distance between the first valve body and the mobile member, a protruding portion for displacing the second valve body in response to a displacement of the mobile member in order to open the first hydraulic passage to establish a fluid communication, and a shaft for opening the second hydraulic passage by displacing the first valve body after the second valve body is displaced by the protruding portion, wherein in a case where the pump is not actuated, no displacement of the mobile portion occurs and the protruding portion is positioned away from the second valve body, so that the first hydraulic passage is closed by the second valve body thereby interrupting the fluid communication, in a case where the pump is actuated while the brake hydraulic pressure is generated by the brake hydraulic pressure generating means, the mobile member is displaced and the protruding portion displaces the second valve body, so that the pressure difference between the brake hydraulic pressure generated within the reservoir chamber and the brake hydraulic pressure generated within the first reservoir port is regulated, and in a case where the pump is actuated while no brake hydraulic pressure is generated by the brake hydraulic pressure generating means, the mobile member is further displaced and the shaft displaces the first valve body, so that the second hydraulic passage is opened to establish the fluid communication.

According to another aspect of the present invention, a pressure regulating reservoir includes a housing, a first conduit provided at the housing and connecting a main conduit and the pressure regulating reservoir, the main conduit connecting a brake hydraulic pressure generating means for generating a brake hydraulic pressure in response to an operation of a brake operation member and a wheel braking force generating means for generating a braking force relative to a wheel, a second conduit provided at the housing and connecting the main conduit and the pressure regulating reservoir in order to allow the brake hydraulic pressure to be transmitted from the brake hydraulic pressure generating means to the pressure regulating reservoir through the second conduit, a reservoir chamber formed at the housing, connected to the first conduit and the second conduit, storing a brake fluid, and connected to an inlet port of a pump for sucking the brake fluid stored at the reservoir chamber, a first reservoir port connecting the reservoir chamber and the second conduit, a second reservoir port connecting the reservoir chamber and the first conduit, a valve portion provided at the first reservoir port and including a first hydraulic passage for allowing the brake fluid to flow therethrough from the second conduit to the reservoir chamber, a first valve body, a second valve body for closing the first hydraulic passage and a valve seat at which a second hydraulic passage, which has a larger passage area than the first hydraulic passage and which is to be closed by the first valve body, is formed, a piston portion including a piston for changing a volume of the reservoir chamber and a spring, which is disposed at the piston portion at a portion opposite from the reservoir chamber relative to the piston so as to bias the piston in a direction of reducing the volume of the reservoir chamber, a spring deformation restricting portion for restricting a stretch of the spring, a protruding portion for displacing the second valve body in response to a displacement of the piston in order to open the first hydraulic passage to establish a fluid communication, and a shaft for opening the second hydraulic passage by displacing the first valve body after the second valve body is displaced by the protruding portion, wherein in a case where the pump is not actuated, the piston is positioned so as to be closer to the spring and the protruding portion is positioned away from the second valve body, so that the first hydraulic passage is closed by the second valve body to interrupt the fluid communication, in a case where the pump is actuated while the brake hydraulic pressure is generated by the brake hydraulic pressure generating means, the piston is displaced in the direction of reducing the volume of the reservoir chamber, so that the pressure difference between the brake hydraulic pressure generated within the reservoir chamber and the brake hydraulic pressure generated within the first reservoir port is regulated by the protruding portion displacing the second valve body, and in a case where the pump is actuated while the brake hydraulic pressure is not generated by the brake hydraulic pressure generating means, the piston is further displaced in the direction of reducing the volume of the reservoir chamber and the shaft displaces the first valve body, so that the second hydraulic passage is opened to establish the fluid communication.

BRIEF DESCRIPTION OF THE DRAWINGS

The foregoing and additional features and characteristics of the present invention will become more apparent from the following detailed description considered with the reference to the accompanying drawings, wherein:

FIG. 5A is a cross-sectional diagram illustrating the pressure regulating reservoir when being operated in a case where a normal brake operation is performed;

FIG. 5B is a cross-sectional diagram illustrating the pressure regulating reservoir when being operated in a case where a pressure regulation is executed;

FIG. 5C is a cross-sectional diagram illustrating the pressure regulating reservoir when being operated in a case where a self-suction by a pump is executed;

DETAILED DESCRIPTION

Figure 1:
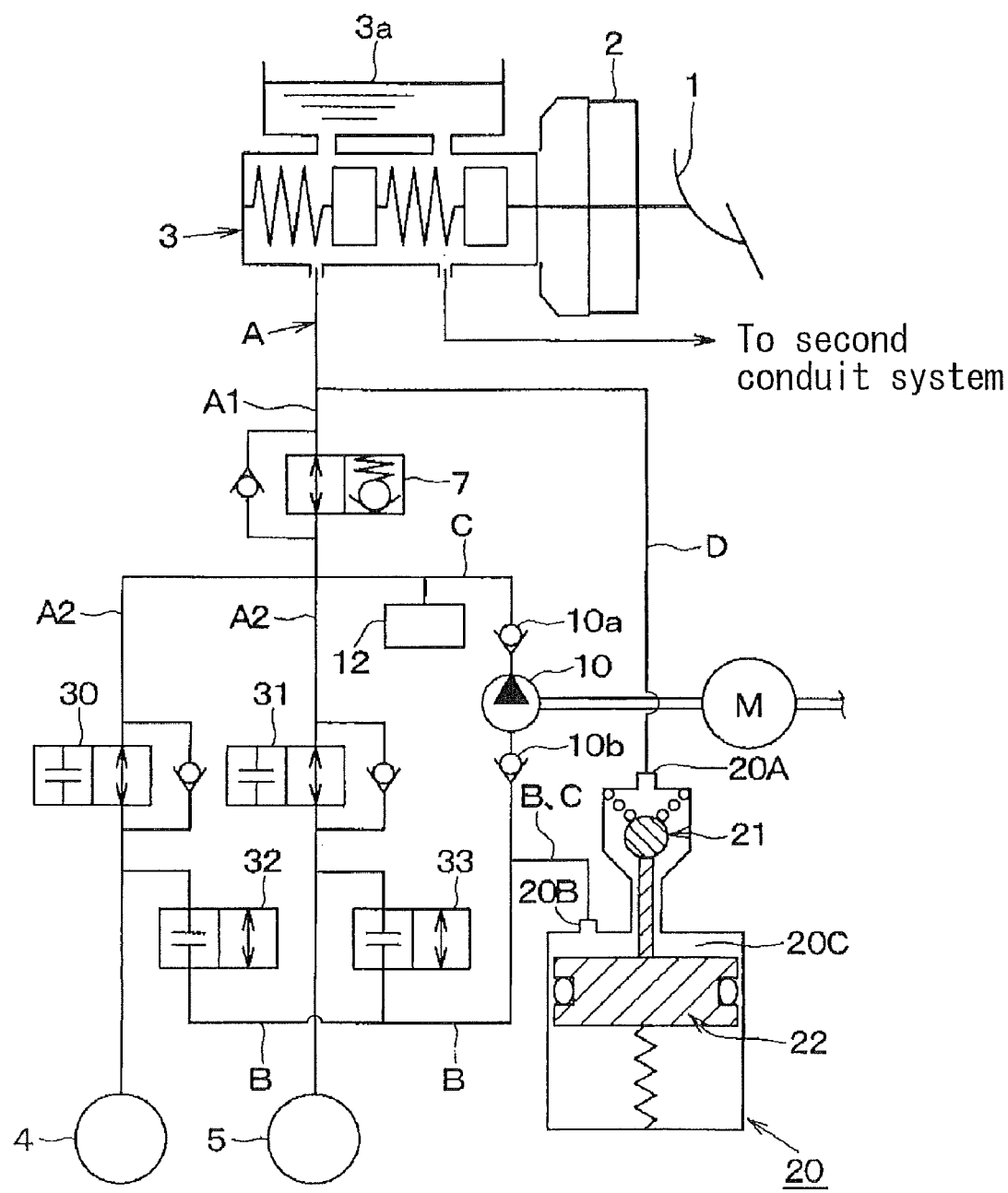
FIG. 1 is a diagram schematically illustrating an arrangement of a conduit used for a brake apparatus to which a pressure regulating reservoir according to a first embodiment is adapted.

Embodiments of a pressure regulating reservoir will be described below. Identical reference numerals in the drawings are used for identical or equivalent portions in each embodiment.

First Embodiment

Illustrated in FIG. 1 is an arrangement example of conduits used for a brake apparatus, to which a pressure regulating reservoir according to a first embodiment is adapted. A basic structure of the brake apparatus will be described below with reference to FIG. 1. The pressure regulating reservoir is schematically illustrated in FIG. 1, and a detailed description about the pressure regulating reservoir will be described later with reference to FIG. 2. Additionally, described in this embodiment is a case where the brake apparatus is adapted to a vehicle having an X-type hydraulic circuits, which is configured by a front-right wheel—rear-left wheel conduit system and a front-left wheel—rear-right wheel conduit system.

A brake pedal 1 serves as a brake operation member, which is depressed by a driver in order to apply a braking force to the vehicle. As illustrated in FIG. 1, the brake pedal 1 is connected to a booster 2, so that a depression force applied to the brake pedal 1 is boosted by the booster 2.

The booster 2 includes a push rod for transmitting the boosted depression force to a master cylinder 3 (which will be hereinafter referred to as a M/C 3), and the like. A master cylinder pressure (which will be hereinafter referred to as a M/C pressure) is generated when the push rod presses a master piston, which is provided at the M/C 3. A brake hydraulic pressure generating means is configured by the brake pedal 1, the booster 2 and the M/C 3.

The M/C 3 is connected to a master reservoir 3a for supplying a brake fluid into the M/C 3 and storing an excess brake fluid from the M/C 3.

The M/C pressure is transmitted to wheel cylinders 4 and 5 (which will be hereinafter referred to as W/C 4 and W/C 5) of respective wheels via an anti-lock control actuator (an anti-skid control actuator, which will be hereinafter referred to as an ABS actuator). The W/Cs 4 and 5 serve as a wheel braking force generating means. Only a first conduit system, which connects the M/C 3 on the one hand and the W/C 4 of a front-right wheel FR and the W/C 5 of a rear-left wheel RL on the other, is illustrated in FIG. 1. However, a second conduit system, which connects the M/C 3 on the one hand and a W/C of a front-left wheel FL and a W/C of a rear-right wheel RR on the other, is configured similarly to the first conduit system. Therefore, hereinafter, a detailed description of the first and second conduit systems will be given with the first conduit system as an example.

The brake apparatus includes a conduit A (which will be hereinafter referred to as a main conduit A) that is connected to the M/C 3. A differential pressure control valve 7 is provided at the main conduit A. The main conduit A is divided into a conduit A1 and a conduit A2 at a portion of the main conduit A at which the differential pressure control valve 7 is provided. More specifically, the main conduit A is divided into the conduit A1, which extends between the M/C 3 and the differential pressure control valve 7 and to which the M/C pressure is applied, and the conduit A2 connecting the differential pressure control valve 7 and the W/Cs 4 and 5.

The differential pressure control valve 7 controls a state of the main conduit A to be in a fluid communication state or a pressure differentiating state. The fluid communication state refers to a state where the differential pressure control valve 7 is opened and a fluid communication between the conduit A1 and the conduit A2 is established via the differential pressure control valve 7. Furthermore, the pressure differentiating state is a part of the fluid communication state. More specifically, the pressure differentiating state refers to a state where a pressure generated at the conduit A1 differs from a pressure generated at the conduit A2. The differential pressure control valve 7 is normally controlled to establish the fluid communication state. However, when the differential pressure control valve 7 is controlled to establish a predetermined pressure differentiating state, the pressure generated at the conduit A2, which connects the differential pressure control valve 7 on the one hand and the W/Cs 4 and 5 on the other, is maintained to be higher than the pressure generated at the conduit A1, which connects the M/C 3 and the differential pressure control valve 7, by a predetermined pressure difference.

Furthermore, the conduit A2 is divided into two conduits. One of two conduits is provided with a pressure increase control valve 30 for controlling an increase of a brake hydraulic pressure applied to the W/C 4, and the other one of two conduits is provided with a pressure increase control valve 31 for controlling an increase of the brake hydraulic pressure applied to the W/C 5.

Each of the pressure increase control valves 30 and 31 is configured as a two-position valve, which is opened and closed by an electronic control unit (ECU) for a brake hydraulic pressure control in order to establish a fluid communication state and a fluid communication interrupted state. The fluid communication state refers to a state where each of the pressure increase control valves 30 and 31 is opened and a fluid communication at each of two conduits of the conduit A2 is established via each of the pressure increase control valves 30 and 31. On the other hand, the fluid communication interrupted state refers to a state where each of the pressure increase control valves 30 and 31 is closed and the fluid communication at each of two conduits of the conduit A2 is interrupted by each of the pressure increase control valves 30 and 31. In a case where each of the two-position valves is controlled to establish the fluid communication state, the brake hydraulic pressure, which is generated by the M/C pressure, discharge of the brake fluid by a pump 10 and the like, is applied to each of the W/Cs 4 and 5. Each of the pressure increase control valves 30 and 31 is generally controlled to establish the fluid communication state in a case where a normal brake operation (e.g. a brake operation in which the brake hydraulic pressure control such as an anti-skid control (anti-lock control, ABS control) and the like is not executed) is performed.

The pressure regulating reservoir 20 includes a first reservoir port 20A and a second reservoir port 20B. The conduit A between the pressure increase control valves 30 and 31 and the W/Cs 4 and 5, respectively, is connected to the second reservoir port 20B of the pressure regulating reservoir 20 via a conduit B (i.e. a first conduit), which connects a portion of one of two conduits between one of the pressure increase control valves 30 and 31 and one of the W/Cs 4 and 5 and a portion of the other one of two conduits between the other one of the pressure increase control valves 30 and 31 and the other one of the W/Cs 4 and 5. Accordingly, the brake hydraulic pressure generated at W/Cs 4 and 5 is controlled by flowing the brake fluid to the pressure regulating reservoir 20 via the conduit B, so that each wheel does not incline to a lock tendency (i.e. so that each wheel is not locked). The pressure regulating reservoir 20 will be described in more detail below.

The conduit B is provided with pressure decease control valves 32 and 33, each of which is opened and closed by the ECU in order to establish a fluid communication state and a fluid communication interrupted state. The fluid communication state refers to a state where each of the pressure decrease control valves 32 and 33 is opened and a fluid communication at the conduit B is established via each of the pressure decrease control valves 32 and 33. On the other hand, the fluid communication interrupted state refers to a state where each of the pressure decrease control valves 32 and 33 is closed and the fluid communication at the conduit B is interrupted by each of the pressure decrease control valves 32 and 33. Each of the pressure decrease control valves 32 and 33 is normally closed and the fluid communication interrupted state is established at the conduit B in the case where the normal brake operation is performed. The conduit B is turned to be in the fluid communication state by the pressure decrease control valves 32 and 33 in order to allow the brake fluid to flow to the pressure regulating reservoir 20 when necessary.

The conduit A is also connected to the second reservoir port 20B of the pressure regulating reservoir 20 via a conduit C (i.e. the first conduit). The conduit C connects a portion of the conduit A between the differential pressure control valve 7 on the one hand and the pressure increase control valves 30 and 31 on the other and the second reservoir port 20B of the pressure regulating reservoir 20. The conduit C includes the pump 10, having check valves 10a and 10b, and an accumulator 12. More specifically, the accumulator 12 is provided to the conduit C at a downstream side of the brake fluid relative to the pump 10, so that a pulsation of the brake fluid generated when the brake fluid is discharged from the pump 10 is reduced. Furthermore, a conduit D (i.e. a second conduit) is provided at the conduit A so as to connect the M/C 3 and the first reservoir port 20A of the pressure regulating reservoir 20. The pump 10 sucks the brake fluid existing within the conduit A1 via the conduit D and the pressure regulating reservoir 20 and discharges the sucked brake fluid to the conduit A2 via a portion of the conduit B and the conduit C, thereby increasing the W/C pressure.

Figure 2:
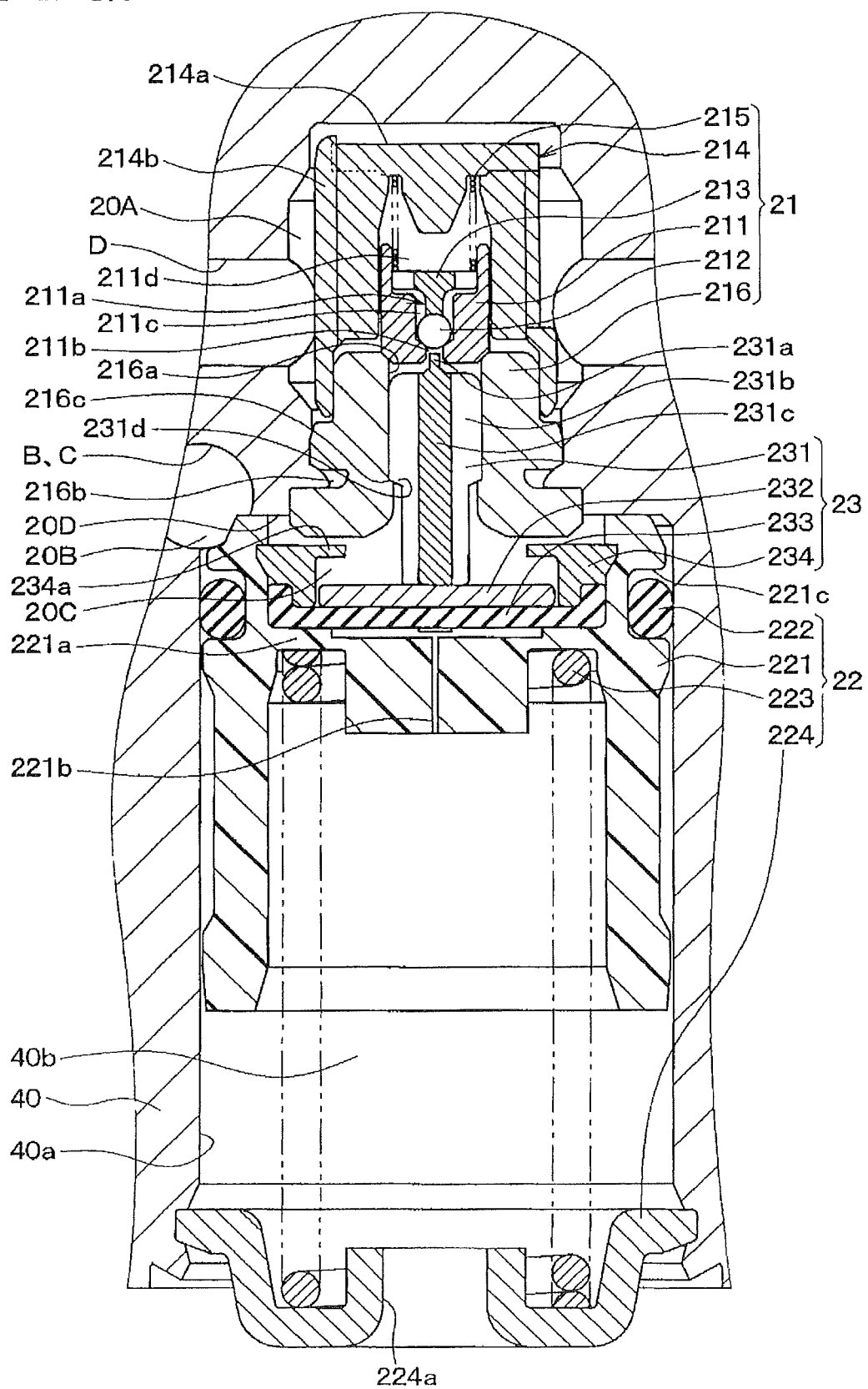
FIG. 2 is a cross-sectional diagram illustrating the pressure regulating reservoir illustrated in FIG. 1.

A configuration of the pressure regulating reservoir 20 will be described below with reference to FIG. 2.

The pressure regulating reservoir 20 is provided within a housing 40, which defines an outer shape of the ABS actuator. The first reservoir port 20A, the second reservoir port 20B and a reservoir chamber 20C are defined by an inner wall surface of a recessed portion 40a, which is formed at the housing 40.

The first reservoir port 20A is defined by a hollow portion formed at the housing 40. More specifically, the pressure regulating reservoir 20 is configured so that the first reservoir port 20A is provided between the M/C 3 and the pump 10, so that the first reservoir port 20A receives the brake fluid from the conduit D, which serves as an inlet conduit to which the same degree of pressure as the M/C pressure is applied. The second reservoir port 20B is defined by a hollow portion having a larger diameter than the hollow portion defining the first reservoir port 20A. The conduits B and C, which serve as outlet conduits, are connected to the reservoir chamber 20C via the second reservoir port 20B. The reservoir chamber 20C is defined by the wall surface of the housing 40 defining the second reservoir port 20B, a piston 221 and the like. Furthermore, the reservoir chamber 20C stores therein the brake fluid flowing thereto via the first reservoir port 20A and the second reservoir port 20B. Additionally, the brake fluid stored within the reservoir chamber 20C is discharged to the main conduit A via the second reservoir port 20B.

More specifically, the second reservoir port 20B is defined by a portion of the wall surface of the housing 40. The first reservoir port 20A is defined by an upper end surface portion 20D of the wall surface of the housing 40 defining the reservoir chamber 20C. The first reservoir port 20A is connected to the conduit D. The second reservoir port 20B is connected to the conduits B and C.

A valve portion 21 is provided at the first reservoir port 20A. The valve portion 21 is configured with a valve 211, a ball valve 212, a pin 213, a filter component 214, a spring 215, a valve seat 216 and the like.

The valve 211 is made of, for example, a ferrous metal and the like. Furthermore, the valve 211 serves as a first valve body, which is operated to open and close a major hydraulic passage 216a formed at the valve seat 216. The detailed description of the first valve body will be given later. Additionally, the valve 211 includes a function of establishing a brake fluid flow passage having a smaller diameter than a diameter of the major hydraulic passage 216a of the valve seat 216 while the major hydraulic passage 216a of the valve seat 216 is closed. More specifically, the valve 211 is formed in a cylindrical shape, so that a hollow portion 211a, which serves as the brake fluid flow passage, is formed at a substantially center portion thereof so as to extend in an axial direction of the valve 211.

The hollow portion 211a is formed in a stepped portion so that a diameter of the brake fluid flow passage is narrowed towards the valve seat 216. An end portion of the hollow portion 211a opened to the valve seat 216 serves as a minor hydraulic passage 211b, which serves as a first hydraulic passage and which has a smaller diameter than the diameter of the major hydraulic passage 216a. In other words, the minor hydraulic passage 211b has a smaller passage area than the major hydraulic passage 216a. Furthermore, the hollow portion 211a includes a first accommodating portion 211c, which is formed so as to be away from the valve seat 216 relative to the minor hydraulic passage 211b and which has a larger diameter than the diameter of the minor hydraulic passage 211b. The ball valve 212 is accommodated within the first accommodating portion 211c. The hollow portion 211a further includes a second accommodating portion 211d at the other end portion of the hollow portion 211a positioned further away from the valve seat 216 relative to the minor hydraulic passage 211b and the first accommodating portion 211c. Furthermore, the second accommodating portion 211d has a larger diameter than the first accommodating portion 211c. The pin 213 is provided within the second accommodating portion 211d. Additionally, a boundary portion between the minor hydraulic passage 211b and the first accommodating portion 211c serves as a seat surface formed in a tapered shape. The ball valve 212 is provided within the first accommodating portion 211c so as to be seated on and detached from the seat surface of the valve 211.

The ball valve 212 serves as a second valve body. The ball valve 212 is made of, for example, the ferrous metal and the like. Furthermore, the ball valve 212 is configured so that a diameter thereof is set to be smaller than the first accommodating portion 211c and larger than the minor hydraulic passage 211b. The minor hydraulic passage 211b is opened when the ball valve 212 is detached from the seat surface of the valve 211. On the other hand, the minor hydraulic passage 211b is closed when the ball valve 212 is seated on the seat surface of the valve 211.

Figure 3A:
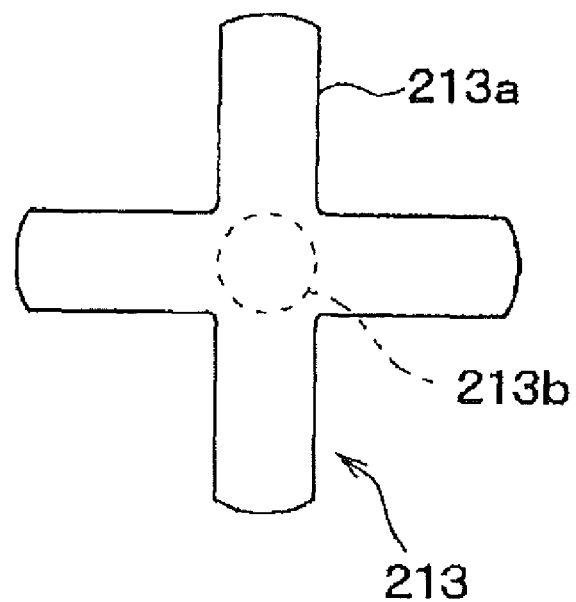
FIG. 3A is a top view of a pin.
Figure 3B:
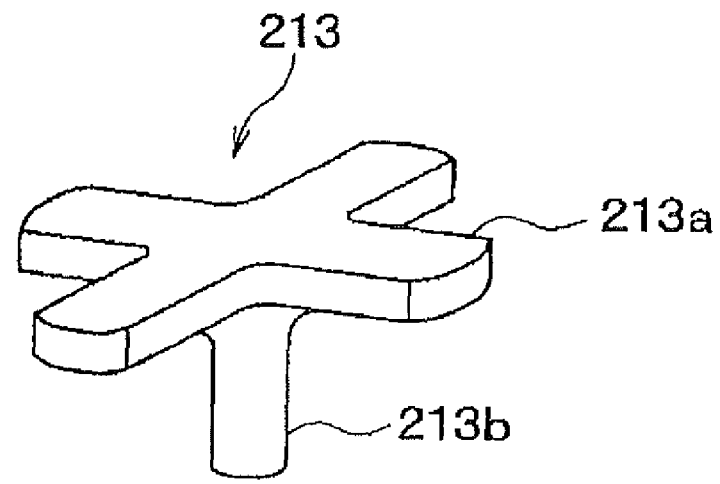
FIG. 3B is a perspective view of the pin.

The pin 213 is made of, for example, the ferrous metal and the like. The pin 213 is provided in order to press the ball valve 212 towards the seat surface of the valve 211. Accordingly, because the ball valve 212 is normally pressed against the seat surface of the valve 211 by the pin 213, the minor hydraulic passage 211b is closed by the ball valve 212 while the normal brake operation is performed. Illustrated in FIG. 3A is a top view of the pin 213. Illustrated in FIG. 3B is a perspective view of the pin 213. As illustrated in FIGS. 3A and 3B, the pin 213 includes a cross-shaped portion 213a and a shaft portion 213b. The shaft portion 213b is formed so as to protrude from a center portion of the cross-shaped portion 213a and to extend towards the ball valve 212. The ball valve 212 is pressed towards the seat surface of the valve 211 by an end portion of the shaft portion 213b. The cross-shaped portion 213a is configured so that a diameter thereof is larger than the diameter of the first accommodating portion 211c in order to accommodate the cross-shaped portion 213a within the second accommodating portion 211d, while a diameter of the shaft portion 213b of the pin 213 is set to be smaller than the diameter of the first accommodating portion 211c, thereby allowing the brake fluid to flow through the valve portion 21 via clearances formed between the cross-shaped portion 213a and the second accommodating portion 211d and between the shaft portion 213b and the first accommodating portion 211c.

The filter component 214 is made of, for example, the ferrous metal, resin or the like. The filter component 214 includes a cover portion 214a, which is formed in a circular shape, and six column members 214b. More specifically, six column members 214b are disposed on the cover portion 214a at regular intervals. Furthermore, six column members 214b are encircled by a mesh filter so as to form, overall, a substantially cup shape. In this embodiment, six column members 214b are provided at the filter component 214. However, the present invention is not limited to the above-described configuration and any desired numbers of column members may be provided.

The spring 215 is disposed between the pin 213 and the filter component 214, so that the pin 213 is biased towards the ball valve 212 by a biasing force of the spring 215.

The valve seat 216 is made of, for example, the ferrous metal and the like. The valve seat 216 is configured to have a hollow portion, which serves as the major hydraulic passage 216a. Additionally, the major hydraulic passage 216a serves as a second hydraulic passage. An outer diameter of one end portion of the valve seat 216 facing the filter component 214 is formed to be the same as or slightly larger than an inner diameter of an opening portion of the filter component 214. The valve 211, the ball valve 212, the pin 213 and the spring 215 are accommodated within the filter component 214, and the valve seat 216 is press-fitted into the opening portion of the filter component 214, thereby integrating the valve 211, the ball valve 212, the pin 213, the filter component 214, the spring 215 and the valve seat 216 to configure the unitized valve portion 21. Additionally, an outer circumferential surface of the valve seat 216 is formed in a stepped shape, so that the outer diameter of the other end portion of the valve seat 216 facing opposite to the filter component 214 is formed to be the largest when comparing to other portions of the valve seat 216. Furthermore, the outer diameter of the valve seat 216 having the largest diameter is set to be larger than an inner diameter of an inlet portion of the hollow portion configuring the first reservoir port 20A. Accordingly, by inserting the valve seat 216 into the hollow portion, which configures the first reservoir port 20A, together with the filter component 214 and the like, a portion of the housing 40 is caulked (fitted) by the stepped portion of the valve seat 216 having the largest diameter, thereby retaining the valve portion 21 within the housing 40.

A circular groove 216b is formed on the outer circumferential surface of the valve seat 216 so as to encircle thereof. A portion of the housing 40 is engaged with the circular groove 216b, so that the valve portion 21 is firmly supported within the housing 40.

A piston portion 22 and a diaphragm portion 23 are provided at the second reservoir port 20B.

The piston portion 22 includes the piston 221, an O-ring 222, a spring 223 and a cover 224.

The piston 221 is made of, for example, the resin and the like. Furthermore, the piston 221 is configured so as to slide along an inner wall surface of the second reservoir port 20B in an up-and-down direction in FIG. 2. The diaphragm portion 23 is provided at a substantially center portion of the piston 221 in a radial direction thereof. More specifically, the piston 221 is formed in a cylindrical shape having a parting wall portion 221a, so that the piston 221 includes an accommodating portion at an upper end portion thereof relative to the parting wall portion 221a in FIG. 2 (i.e. an upper end portion positioned in the vicinity of the valve portion 21 relative to the parting wall portion 221a). The diaphragm portion 23 is accommodated within the accommodating portion formed at the piston 221. Furthermore, a communication bore 221b is formed at a substantially center portion of the parting wall portion 221a, so that a pressure generated within an opposing chamber 40b (i.e. a chamber 40b positioned so as to be opposite from the reservoir chamber 20C relative to the piston 221) is transmitted to the diaphragm portion 23 through the communication bore 221b.

The O-ring 222 is provided at an outer circumferential surface of the piston 221. A circular groove 221c is formed at a portion of the piston 221, so that the O-ring 222 is disposed within the circular groove 221c.

The spring 223 is disposed between the piston 221 and the cover 224, so that the spring 223 contacts the parting wall portion 221a of the piston 221 so as to bias the piston 221 towards the valve portion 21. In other words, the spring 223 biases the piston 221 in a direction of decreasing a volume of the reservoir chamber 20C.

The cover 224 receives the spring 223. Furthermore, the cover 224 is fixed at an opening (an inlet portion) of the hollow portion formed at the housing 40. An atmosphere introducing bore 224a is formed on a substantially center portion of the cover 224 in a radial direction thereof, so that the pressure generated within the opposing chamber 40b, which is defined between the piston 221 and the cover 224, is maintained to be equal to an atmospheric pressure.

The diaphragm portion 23 includes a shaft 231, a plate 232, a cup 233 and a stopper 234.

The shaft 231 is provided within the major hydraulic passage 216a of the valve seat 216. Furthermore, the shaft 231 is configured so as to include a protruding portion 231a, which has a smaller diameter than the diameter of the minor hydraulic passage 211b, at one end portion of the shaft 231 facing the valve 211. The shaft 231 is configured so as to be slidable within the major hydraulic passage 216a, which allows the protruding portion 231a to move within the minor hydraulic passage 211b in response to the slide movement of the shaft 231, so that the shaft 231 pushes the ball valve 212 and is disengaged from the ball valve 212.

Figure 4A:
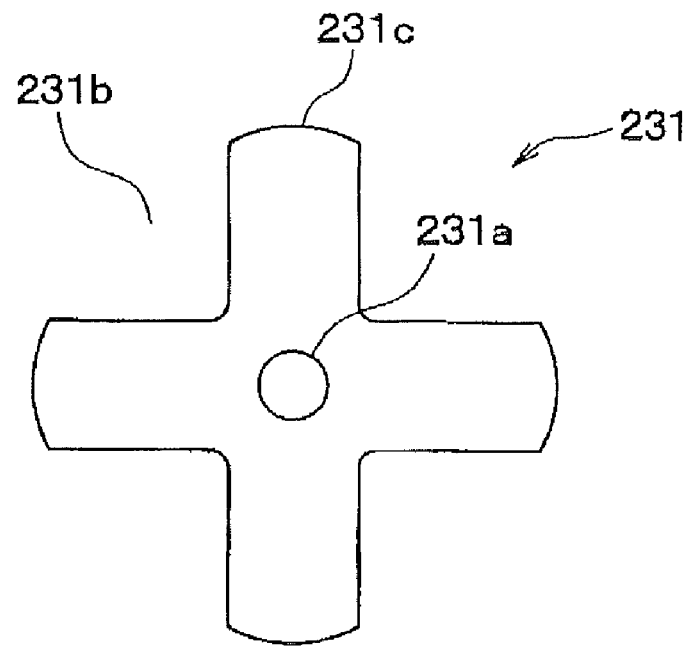
FIG. 4A is a top view of a shaft.
Figure 4B:
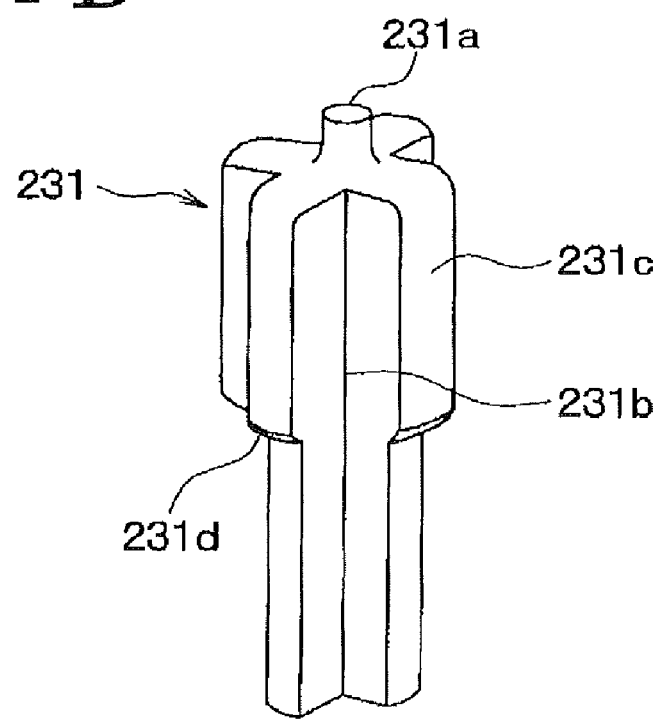
FIG. 4B is a perspective view of the shaft.

Illustrated in FIG. 4A is a top view of the shaft 231. Illustrated in FIG. 4B is a perspective view of the shaft 231. One or more of slits 231b are provided at the shaft 231 along an axial direction of the shaft 231 at regular intervals in a circumferential direction. For example, in this embodiment, four slits 231b are provided at the shaft 231 at regular intervals, so that the shaft 231 includes a cross-shaped portion 231c, whose cross-sectional shape orthogonal to the axial direction is formed in a crossed shape, as illustrated in FIGS. 4A and 4B. Accordingly, the brake fluid is allowed to flow through the major hydraulic passage 216a via the slits 231b of the cross-shaped portion 231c.

The protruding portion 231a is provided at an end portion of the cross-shaped portion 231c facing the valve 211 so as to protrude in the axial direction of the shaft 231 from a top portion of the cross-shaped portion 231c. Furthermore, an amount (i.e. a length) of the protruding portion 231a protruding from the cross-shaped portion 231c is set to at least a length by which the protruding portion 231a pushes the ball valve 212 upwardly when the cross-shaped portion 231c contacts the valve 211. Additionally, a distance between the cross-shaped portion 231c and the valve 211 is set to be shorter than a maximum value of a displacement amount of the cup 233, so that the valve 211 is upwardly pushed by the cross-shaped portion 231c in response to a displacement of the cup 233.

The cross-shaped portion 231c includes a stepped portion 231d (a second stepped portion) by which an outer diameter of the cross-shaped portion 231c is decreased. More specifically, the outer diameter of a bottom portion of the cross-shaped portion 231c of the shaft 231 positioned opposite to the valve 211 is set to be smaller than the outer diameter of an upper portion of the cross-shaped portion 231c positioned in the vicinity of the valve 211 via the stepped portion 231d. A stepped portion 216c (a first stepped portion) is formed at an inner wall surface of the major hydraulic passage 216a of the valve seat 216 so as to correspond to the stepped portion 231d of the cross-shaped portion 231c. Accordingly, the shaft 231 is supported within the major hydraulic passage 216a of the valve seat 216. As a result, the shaft 231 is supported at the housing 40 together with the valve portion 21 in the state where the shaft 231 is accommodated within the valve portion 21. Furthermore, a distance between the stepped portion 216c of the valve seat 216 and an upper end surface thereof is set to be constant. Furthermore, a distance between the stepped portion 231d of the shaft 231 and the protruding portion 231a thereof is also set to be constant. Therefore, a positional relationship between the protruding portion 231a and the ball valve 212 is determined on the basis of the positional relationship between the stepped portion 216c of the valve seat 216 and the stepped portion 231d of the shaft 231, as a result, a lifting amount of the ball valve 212 is easily controlled.

The plate 232 is configured so as to move the shaft 231 towards the ball valve 212, while the plate 232 is configured so as to restrict the displacement (a moving amount) of the shaft 231. The plate 232 is made of, for example, the ferrous material and the like. Furthermore, the plate 232 is configured as a disc shaped member. The plate 232 is moved in the up-and-down direction in FIG. 2 in response to a deformation of the cup 233. However, the displacement of the plate 232 in the upward direction in FIG. 2 is restricted when an outer edge portion of the plate 232 contacts the stopper 234. Therefore, even in the case where the shaft 231 is moved in response to the displacement of the plate 232, the displacement (i.e. the moving amount) of the shaft 231 is limited to a distance (an amount) equal to a distance between a displacement starting point of the plate 232 and a position where the plate 232 contacts the stopper 234.

The cup 233 is made of, for example, an elastic material, such as a rubber and the like. The cup 233 is disposed between the plate 232 and the parting wall portion 221a. Furthermore, the cup 233 is configured so as to form a flat shape, as illustrated in FIG. 2, while the brake hydraulic pressure control is not executed. However, when a pressure difference is generated between the pressure within the reservoir chamber 20C (which will be hereinafter referred to as a reservoir internal pressure) and the pressure within the opposing chamber 40b (i.e. the atmospheric pressure), the cup 233 is deformed in response to the pressure difference. In other words, in a case where a negative pressure is generated within the reservoir chamber 20C when the pump 10 sucks the brake fluid in the reservoir chamber 20C, the pressure within the reservoir chamber 20C becomes lower than the atmospheric pressure within the opposing chamber 40b, thereby deforming the cup 233. Accordingly, the cup 233 pushes the plate 232 in the upward direction in FIG. 2 in response to the deformation of the cup 233.

In this embodiment, the plate 232 and the cup 233 of the diaphragm portion 23 serve as a mobile portion. Furthermore, the cup 233 of the diaphragm portion 23 serves as a diaphragm.

The stopper 234 is configured as a ring-shaped member made of, for example, the ferrous material and the resin or the like. The stopper 234 is supported by the piston 221, which serves as a supporting member. The stopper 234 fixes the cup 233 to the piston 221 in a manner where the stopper 234 presses an outer edge portion of the cup 233 towards the piston 221. Additionally, the stopper 234 restricts the displacement of the plate 232 in the upward direction in FIG. 2. The stopper 234 is configured so as to be engaged with an inner circumferential surface of the piston 221 at the end portion thereof positioned in the vicinity of the valve portion 21, so that the stopper 234 is press-fitted into the piston 221 in the state where the cup 233 and the plate 232 are provided within the piston 221. As a result, the stopper 234 is fixed within the piston 211 in a snap-fit manner, so that the cup 233 and the plate 232 are disposed within the piston 221. A flange portion 234a is provided at the stopper 234 so as to inwardly protrude in the radial direction thereof from the inner circumferential surface thereof. Accordingly, a diameter of an opening of the stopper 234 opening to the valve portion 21 is narrowed by the flange portion 234a so that the diameter of the opening of the stopper 234 opening to the stopper 234 becomes smaller than an outer diameter of the plate 232. Hence, the displacement of the plate 232 is restricted by the flange portion 234a of the stopper 234.

The pressure regulating reservoir 20 is configured as mentioned above. An operation of the pressure regulating reservoir 20 will be described below with reference to FIG. 5.

While the normal brake operation is performed, the pump 10 is not actuated. Therefore, because the reservoir internal pressure and the brake hydraulic pressure are balanced, the cup 233 is not deformed. In this case, as illustrated in FIG. 5A, because the shaft 231 is not upwardly displaced in FIG. 5A, the protruding portion 231a is positioned away from the ball valve 212 and the end portion of the cross-shaped portion 231c of the shaft 231 is also positioned away from the valve 211. Accordingly, the ball valve 212 is pressed against the seat surface of the valve 211 by the biasing force of the spring 215 and the pin 213, thereby closing the minor hydraulic passage 211b and the major hydraulic passage 216a. Therefore, the valve portion 21 of the pressure regulating reservoir 20 is turned to be in a valve closed state, so that the brake fluid is prevented from flowing into the reservoir chamber 20C even if the M/C pressure is applied to the first reservoir port 20A in response to the depression of the brake pedal 1. As a result, the valve portion 21 is closed (i.e. the valve closed state is established at the valve portion 21) while the normal brake operation is performed, thereby avoiding the brake fluid from being unnecessarily used at the pressure regulating reservoir 20.

In a case where, for example, a pressure regulation (a pressure modulation) is executed (e.g. in the case where a brake assist control is executed) while the brake pedal 1 is depressed and the M/C pressure is applied to the first reservoir port 20A, the pump 10 is actuated and the negative pressure is generated within the reservoir chamber 20C. Accordingly, as illustrated in FIG. 5B, the cup 233 is deformed and the plate 232 is upwardly displaced in FIG. 5B in response to the deformation of the cup 233, thereby upwardly pressing the shaft 231. As a result, the protruding portion 231a is inserted into the minor hydraulic passage 211b. Accordingly, the reservoir internal pressure is regulated (modulated) as described above. More specifically, in this case, because the M/C pressure is applied to the first reservoir port 20A, the reservoir internal pressure is maintained so as to balance against the pressure applied to the first reservoir port 20A. Therefore, the ball valve 212 is retained away from the seat surface of the valve 211 so as to form a clearance therebetween. In other words, the ball valve 212 is retained away from the seat surface of the valve 211 at a position where the pressure difference is maintained. Accordingly, the cup 233 is not deformed so as to reach a maximum level of its deformation, and only the ball valve 212 is upwardly pushed by the protruding portion 231a of the shaft 231, but the valve 211 is not upwardly pushed by the shaft 231.

On the other hand, in a case where a self-suction of the brake fluid is executed by the pump 10, more specifically, for example, in a case where a braking force is generated by actuating the pump 10 to suck the brake fluid while the M/C pressure is not generated such as a case where a traction control, an electronic stability control or the like is executed, the negative pressure is generated within the reservoir chamber 20C by actuating the pump 10. In this case, because the M/C pressure is not applied to the first reservoir port 20A, the cup 233 is deformed so as to reach the maximum deformation (i.e. so that the deformation (an amount of deformation) of the cup 233 reaches the maximum level), as illustrated in FIG. 5C. More specifically, in the case where the cup 233 is deformed so as to reach the maximum deformation, the plate 232 is upwardly displaced in FIG. 5C in response to the deformation of the cup 233, and the shaft 231 is also upwardly displaced. Accordingly, not only is the ball valve 212 being upwardly pushed by the protruding portion 231a, but also the valve 211 is upwardly pushed by the shaft 231. As a result, the major hydraulic passage 216a is opened to establish the fluid communication therethrough, so that an inlet diameter of the pressure regulating reservoir 20 is enlarged when comparing to the case where only the minor hydraulic passage 211b is opened. Accordingly, the responsiveness while the brake hydraulic pressure control is executed may be improved.

As described above, according to the pressure regulating reservoir 20 of the first embodiment, the minor hydraulic passage 211b and the major hydraulic passage 216a are closed while the normal brake operation is performed. Therefore, the valve portion 21 is closed (i.e. the valve closed state is established) while the normal brake operation is performed, so that the brake fluid may not unnecessarily be used at the pressure regulating reservoir 20. Furthermore, according to the pressure regulating reservoir 20 of the first embodiment, only the minor hydraulic passage 211b is opened while the pressure regulation is executed, so that the pressure regulating reservoir 20 properly exerts a pressure regulating function. Moreover, the major hydraulic passage 216a is also opened while the self-suction of the brake fluid is executed by the pump 10, thereby enlarging the inlet diameter of the pressure regulating reservoir 20 and improving the responsiveness of the brake hydraulic pressure control.

Second Embodiment

A second embodiment of a pressure regulating reservoir will be described below. Described in the second embodiment is a modification example of the pressure regulating reservoir 20 of the first embodiment. Therefore, only the pressure regulating reservoir 20 will be described and the other configuration of the brake apparatus will not be described in the second embodiment.

Figure 6:
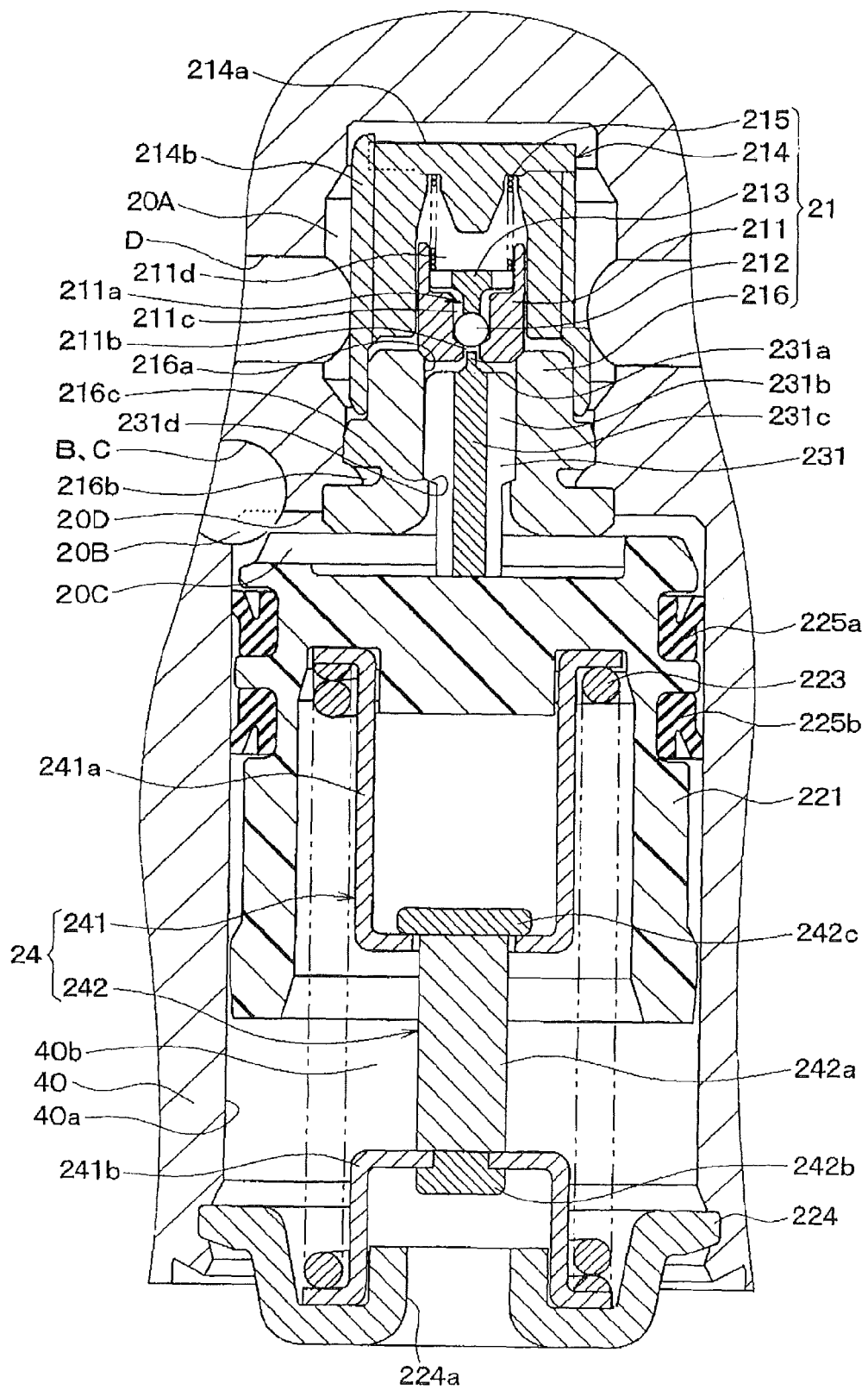
FIG. 6 is a cross-sectional diagram illustrating a pressure regulating reservoir according to a second embodiment.

Illustrated in FIG. 6 is a cross-sectional diagram of the pressure regulating reservoir 20 according to the second embodiment. As illustrated in FIG. 6, the pressure regulating reservoir 20 of the second embodiment differs from the first embodiment in that a spring deformation restricting portion 24 is provided at the pressure regulating portion 20 of the second embodiment instead of the diaphragm portion 23.

The spring deformation restricting portion 24 includes a retainer 241 and a rod 242. The retainer 241 determines a length of the spring 233 in a stretch-and-compression direction thereof. In other words, the retainer 214 determines a distance (a length) of the spring 233 between end portions thereof in the stretch-and-compression direction. More specifically, the retainer 241 includes a first retainer 241a and a second retainer 241b. The first retainer 241a is formed in a cylindrical shape having a bottom cover portion at one end portion thereof. Furthermore, a hole is formed on a center portion of the bottom cover portion of the first retainer 241a. Additionally, a flange portion is provided at the other end portion of the first retainer 241a (i.e. at an end portion of the first retainer 241a forming an opening portion) opposite to the bottom cover portion thereof so as to outwardly protrude in a radial direction thereof. The first retainer 241a is provided at the pressure regulating reservoir 20 so that the flange portion is disposed between one end portion of the spring 223 and the parting wall portion 221a of the piston 221. Similarly, the second retainer 241b is formed in a cylindrical shape having a cover portion at one end portion thereof. Furthermore, a hole is formed on a center portion of the cover portion of the second retainer 241b. Additionally, a flange portion is provided at the other end portion of the second retainer 241b (i.e. at an end portion of the second retainer 241b forming an opening portion) opposite to the cover portion thereof so as to outwardly protrude in a radial direction thereof. The second retainer 241b is provided at the pressure regulating reservoir 20 so that the flange portion is disposed between the other end portion of the spring 223 and the cover 224. Additionally, the hole of the bottom cover portion of the first retainer 241a is formed so that a diameter of the hole is set to be slightly larger than a diameter of the rod 242 in order to allow the first retainer portion 241a to be slidable along the rod 242.

The rod 242 connects the first retainer 241a and the second retainer 241b. More specifically, the rod 242 connects the end portion of the first retainer 241a and the end portion of the second retainer 241b, i.e. the bottom cover portion of the first retainer 241a and the cover portion of the second retainer 241b, so that stretch (i.e. the deformation) of the spring 223 (i.e. an amount of the spring 223 being stretched) is restricted by the rod 242 together with the first and second retainers 241a and 241b. More specifically, the rod 242 includes a first rod portion 242a formed in a column shape and a second rod portion 242b. The second rod portion 242b is fixed at one end portion of the first rod portion 242a in order to fix the second retainer 241b to the rod 242. A stopper portion 242c is provided at the other end portion of the first rod portion 242a. The stopper portion 242c restricts a movement (i.e. a moving amount, a moving distance) of the first retainer 241a in an upward direction in FIG. 6. Furthermore, a protruding portion is formed at the second rod portion 242b, so that the protruding portion is inserted into a hole provided at the cover portion of the second retainer 241b. Then, an end portion of the protruding portion formed at the second rod portion 242b is fixed to the one end portion of the first rod portion 242a, which differs from the other end portion thereof having the stopper portion 242c, accordingly, the second retainer 241b is fixed to the rod 242. The spring deformation restricting portion 24 is provided at the pressure regulating reservoir 20 in a manner where: firstly, the spring 223 is disposed between the first retainer 241a and the second retainer 241b; secondly, the first rod portion 242a is inserted into the hole formed at the bottom cover portion of the first retainer 241a from the one end portion of the first rod portion 242a, which differs from the other end portion thereof having the stopper portion 242c; thirdly, the second rod 242b is inserted into the hole formed at the cover portion of the second retainer 241b; and fourthly, the first rod portion 242a and the second rod portion 242b are connected to each other.

According to the pressure regulating reservoir 20 of the second embodiment, the spring deformation restricting portion 24 is configured so that the second retainer 241b is fixed to the rod 242 and a displacement of the first retainer 241a in the upward direction in FIG. 6 is restricted by the stopper portion 242c of the rod 242. Accordingly, a maximum length (i.e. a stretching amount) of the spring 223 is controlled on the basis of lengths of the first retainer 241a, the rod 242 and the second retainer 241b. Therefore, in a case where the negative pressure is not generated within the reservoir chamber 20C and the piston 221 is positioned closer to the spring 223 (i.e. the piston 221 is positioned so as to correspond to an upper portion of the spring 223 (i.e. an upper portion of the spring deformation restricting portion 24)), the piston 221 is positioned away from the upper end surface 20D of the wall surface defining the reservoir chamber 20C.

According to the pressure regulating reservoir 20 of the second embodiment, because the deformation (i.e. the maximum length) of the spring 223 is restricted by the spring deformation restricting portion 24, the piston 221 is positioned away from the upper end surface 20D of the wall surface defining the reservoir chamber 20C in the case where the negative pressure is not generated within the reservoir chamber 20C.

Accordingly, the piston 221 is positioned away from the upper end surface 20D of the wall surface defining the reservoir chamber 20C and the shaft 231 is positioned away from the ball valve 212 while the normal brake operation is performed. In this case, the ball valve 212 contacts the seat surface of the valve 211. As a result, the valve portion 21 is closed (i.e. the valve closed state is established at the valve portion 21) while the normal brake operation is performed, thereby avoiding the brake fluid from being unnecessarily used at the pressure regulating reservoir 20.

On the other hand, in the case where the pressure regulation (the pressure modulation) is executed, the pump 10 is actuated, which results in generating the negative pressure within the reservoir chamber 20C. Therefore, the piston 221 is upwardly displaced in FIG. 6 in response to the generation of the negative pressure within the reservoir chamber 20C. Accordingly, the reservoir internal pressure is regulated (modulated) as described above. More specifically, in this case, because the M/C pressure is applied to the first reservoir port 20A, the reservoir internal pressure is maintained so as to balance against the pressure applied to the first reservoir port 20A. Therefore, the ball valve 212 is retained to be away from the seat surface of the valve 211 so as to form the clearance therebetween. In other words, the ball valve 212 is retained away from the seat surface of the valve 211 at the position where the pressure difference is maintained. Accordingly, only the ball valve 212 is upwardly pressed by the protruding portion 231a, but the valve 211 is not pushed upwardly by the shaft 231.

In the case where self-suction of the brake fluid is executed by the pump 10, because the M/C pressure is not applied to the first reservoir port 20A, the piston 221 and the shaft 231 are upwardly displaced in FIG. 6 in response to the generation of the negative pressure within the reservoir chamber 20C. Accordingly, not only is the ball valve 212 being pushed upwardly by the protruding portion 231a of the shaft 231, but also the valve 211 is pushed upwardly by the shaft 231. As a result, the major hydraulic passage 216a is also opened to establish the fluid communication therethrough, so that the inlet diameter of the pressure regulating reservoir 20 is enlarged when comparing to the case where only the minor hydraulic passage 211b is opened. As a result, the responsiveness of the brake hydraulic pressure control may be improved.

The O-ring 222 is provided at the outer circumferential surface of the piston 221 as a seal member in the first embodiment. On the other hand, in the second embodiment, two C-rings 225a and 225b are used as the seal member instead of the O-ring 222. Accordingly, the C-rings 225a and 225b may be used as the seal member.

Any desired seal member may be used at the pressure regulating reservoir 20, as long as the seal member is configured so as to allow the piston 221 to be displaced in the upward direction in FIG. 6 by the restriction of the maximum extended length of the spring 223 and without using the elastic force of the spring 223, in other words, in response to only the negative pressure generated within the reservoir chamber 20C. Therefore, a seal member, which reduces a slide resistance of the piston 221, may be preferably used for the pressure regulating reservoir 20.

Third Embodiment

A third embodiment of a pressure regulating reservoir will be described below. Described in the third embodiment is another modification example of the pressure regulating reservoir 20 of the first embodiment, and the other configuration of the brake apparatus is similar to the first embodiment. Therefore, only the pressure regulating reservoir 20 will be described in the third embodiment.

Figure 7:
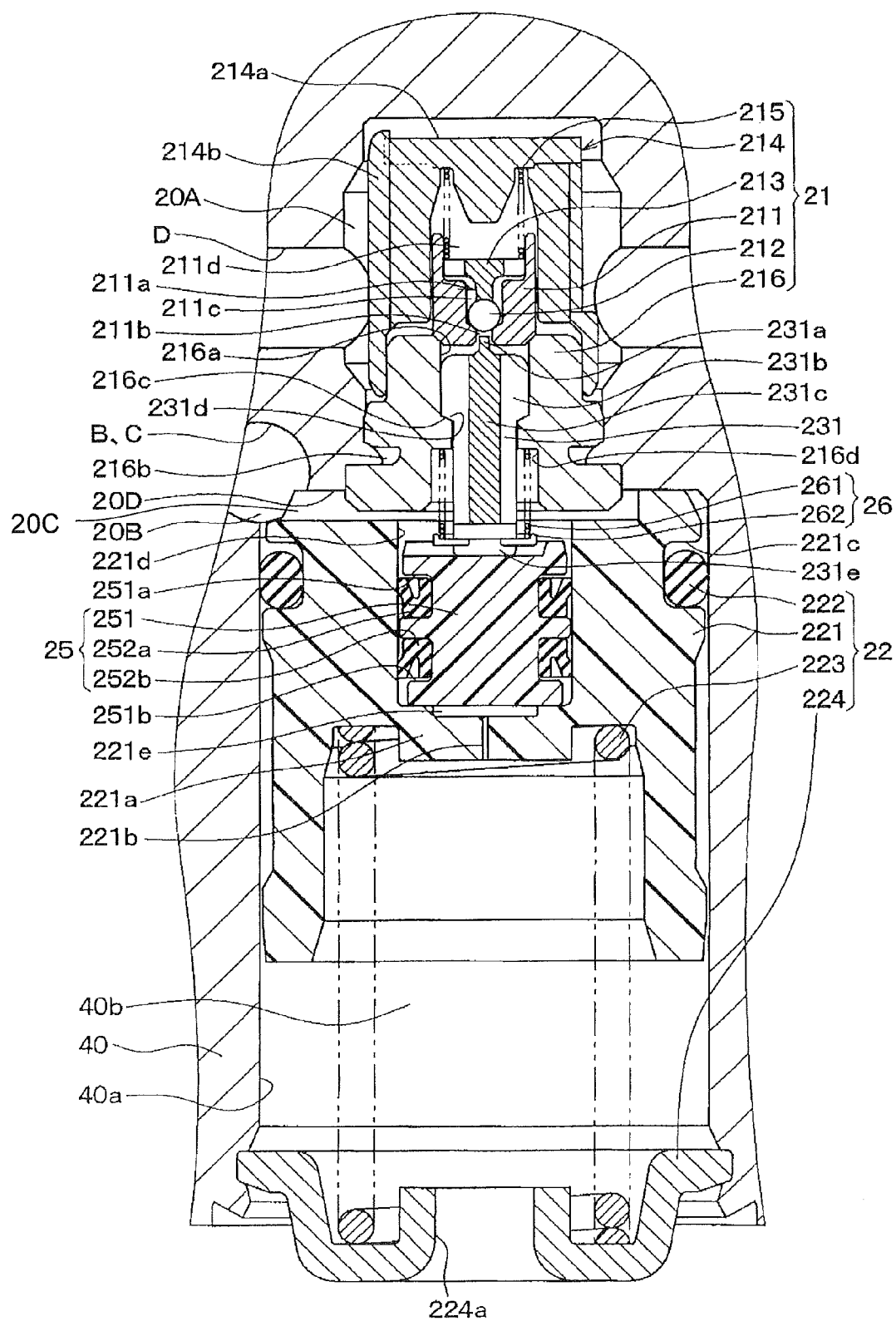
FIG. 7 is a cross-sectional diagram illustrating a pressure regulating reservoir according to a third embodiment.

Illustrated in FIG. 7 is a cross-sectional diagram of the pressure regulating reservoir 20 according to the third embodiment. As illustrated in FIG. 7, the pressure regulating reservoir 20 of the third embodiment differs from the pressure regulating reservoir 20 of the first embodiment in that the pressure regulating reservoir 20 includes a minor piston portion 25 instead of the diaphragm portion 23 (excluding the shaft 231). According to the third embodiment, the minor piston portion 25 serves as the mobile portion.

The minor piston portion 25 is provided at the center portion of the piston 221. The minor piston portion 25 is displaced in an axial direction of the piston 221 in response to the pressure difference generated between the reservoir internal pressure and the brake hydraulic pressure, so that the minor piston portion 25 moves the shaft 231 in the axial direction.

More specifically, the minor piston portion 25 is accommodated within a recessed portion 221d, which is formed at the center portion of the parting wall portion 221a of the piston 221 so as to extend in the axial direction and which is formed in a cylindrical bore shape. Furthermore, the minor piston portion 25 includes a piston 251 and two C-rings 252a and 252b (first and second C-rings 252a and 252b). The piston 251 is formed in a substantially column shape. Furthermore, the piston 251 is configured so as to slide along an inner wall surface of the recessed portion 221d. The first and second C-rings 252a and 252b are provided at an outer circumferential surface of the piston 251.

The piston 251 is coaxially provided within the recessed portion 221d of the piston 221 so that a center axis of the piston 251 corresponds to a center axis of the piston 221 and a center axis of the shaft 231. Accordingly, the piston 251 is provided within the recessed portion 221d of the piston 221 so as to be slidable within the recessed portion 221d along the center axis. Two circular grooves 251a and 251b (first and second circular grooves 251a and 251b) are formed on the outer circumferential surface of the piston 251 so as to encircle the piston 251. The first and second C-rings 252a and 252b are fitted into the first and second circular grooves 251a and 251b, respectively, so that a clearance formed between the inner wall surface of the recessed portion 221d and the outer circumferential surface of the piston 251 is sealed by the first and second C-rings 252a and 252b. Accordingly, a clearance between the reservoir chamber 20C and the opposing chamber 40b is fluid-tightly closed (sealed) by the first and second C-rings 252a and 252b (i.e. each of the reservoir chamber 20C and the opposing chamber 40b is fluid-tightly closed (sealed) by the first and second C-rings 252a and 252b).

The pressure regulating reservoir 20 according to the third embodiment further includes a return spring portion 26. The return spring portion 26 downwardly biases the shaft 231 in FIG. 7, more specifically, the return spring portion 26 biases the shaft 231 towards minor piston portion 25. An accommodating portion 216d is formed at the inner circumferential surface of the valve seat 216, so that the return spring portion 26 is provided within the accommodating portion 216d. A fixing portion 231e is fixed at an end portion of the shaft 231 facing the minor piston portion 25. More specifically, the diameter of the major hydraulic passage 216a of the valve seat 216 is enlarged at a portion thereof positioned in the vicinity of the piston 221 relative to the stepped portion 216c of the valve seat 216, so that the portion having the enlarged diameter serves as the accommodating portion 216d for accommodating the return spring portion 26.

The return spring portion 26 includes a return spring 261 and a stopper portion 262. The return spring portion 26 is configured so that one end portion of the return spring 261 contacts an upper end surface of the accommodating portion 216d of the valve seat 216 and the other one end portion of the return spring 261 contacts the stopper portion 262, which is formed in a disc shape. The fixing portion 231e is fixed at the other end portion of the shaft 231 facing opposite to the ball valve 212. Furthermore, a protruding portion formed at the fixing portion 231e is fitted into a hole formed at the stopper portion 262, thereby fixing the stopper 262 at the other end portion of the shaft 231.

According to the third embodiment, the communication bore 221b is formed at a center portion of the parting wall portion 221a of the piston 221 so as to connect the recessed portion 221d and the opposing chamber 40b to establish a communication therebetween. A recess 221e is formed at a bottom surface of the recessed portion 221d in order to allow the atmospheric pressure, which is transmitted to the recessed portion 221d via the communication bore 221b, to act on the minor piston portion 25 at a wider area even in a case where the minor piston portion 25 contacts the bottom surface of the recessed portion 221d.

According to the third embodiment, the pressure regulating reservoir 20 is configured so that the shaft 231 is moved in an up-and-down direction in FIG. 7 by the minor piston portion 25. Furthermore, the shaft 231 is biased towards the minor piston portion 25 (i.e. the shaft 231 is biased in the downward direction in FIG. 7) by means of the return spring portion 26. Accordingly, in the case where the negative pressure is not generated within the reservoir chamber 20C, the protruding portion 231a of the shaft 231 is positioned away from the ball valve 212.

Accordingly, while the normal brake operation is performed, the minor piston portion 25 contacts the bottom surface of the recessed portion 221d and the shaft 231 is positioned away from the ball valve 212. Accordingly, the ball valve 212 contacts the seat surface of the valve 211. As a result, the valve portion 21 is closed (i.e. the valve closed state is established at the valve portion 21) while the normal brake operation is performed, thereby avoiding the brake fluid from being unnecessarily used at the pressure regulating reservoir 20.

On the other hand, in the case where the pressure regulation (the pressure modulation) is executed, the pump 10 is actuated and the negative pressure is generated within the reservoir chamber 20C. Accordingly, the minor piston portion 25 is upwardly displaced in FIG. 7 in response to the generation of the negative pressure within the reservoir chamber 20C. In such manner, the reservoir internal pressure is regulated (modulated). More specifically, in this case, because the M/C pressure is applied to the first reservoir port 20A, the reservoir internal pressure is maintained so as to balance against the pressure applied to the first reservoir port 20A. Therefore, the ball valve 212 is retained away from the seat surface of the valve 211 so as to form the clearance therebetween. In other words, the ball valve 212 is retained away from the seat surface of the valve 211 at the position where the pressure difference is maintained. Accordingly, only the ball valve 212 is upwardly pushed by the protruding portion 231a, but the valve 211 is not upwardly pushed by the shaft 231.

In the case where self-suction of the brake fluid is executed by the pump 10, because the M/C pressure is not applied to the first reservoir port 20A, the minor piston portion 25 and the shaft 231 are upwardly displaced in FIG. 7 in response to the generation of the negative pressure within the reservoir chamber 20C. Accordingly, not only is the ball valve 212 being pushed upwardly by the protruding portion 231a of the shaft 231, but also the valve 211 is pushed upwardly by the shaft 231. As a result, the major hydraulic passage 216a is also opened to establish the fluid communication therethrough, so that the inlet diameter of the pressure regulating reservoir 20 is enlarged when comparing to the case where only the minor hydraulic passage 211b is opened. As a result, the responsiveness of the brake hydraulic pressure control may be improved.

Fourth Embodiment

A fourth embodiment of a pressure regulating reservoir will be described below. Described in the fourth embodiment is a modification example of the pressure regulating reservoir 20 of the first embodiment. However, because other configurations of the brake apparatus are similar to the first embodiment, only the pressure regulating reservoir 20 will be described in the fourth embodiment.

Figure 8:
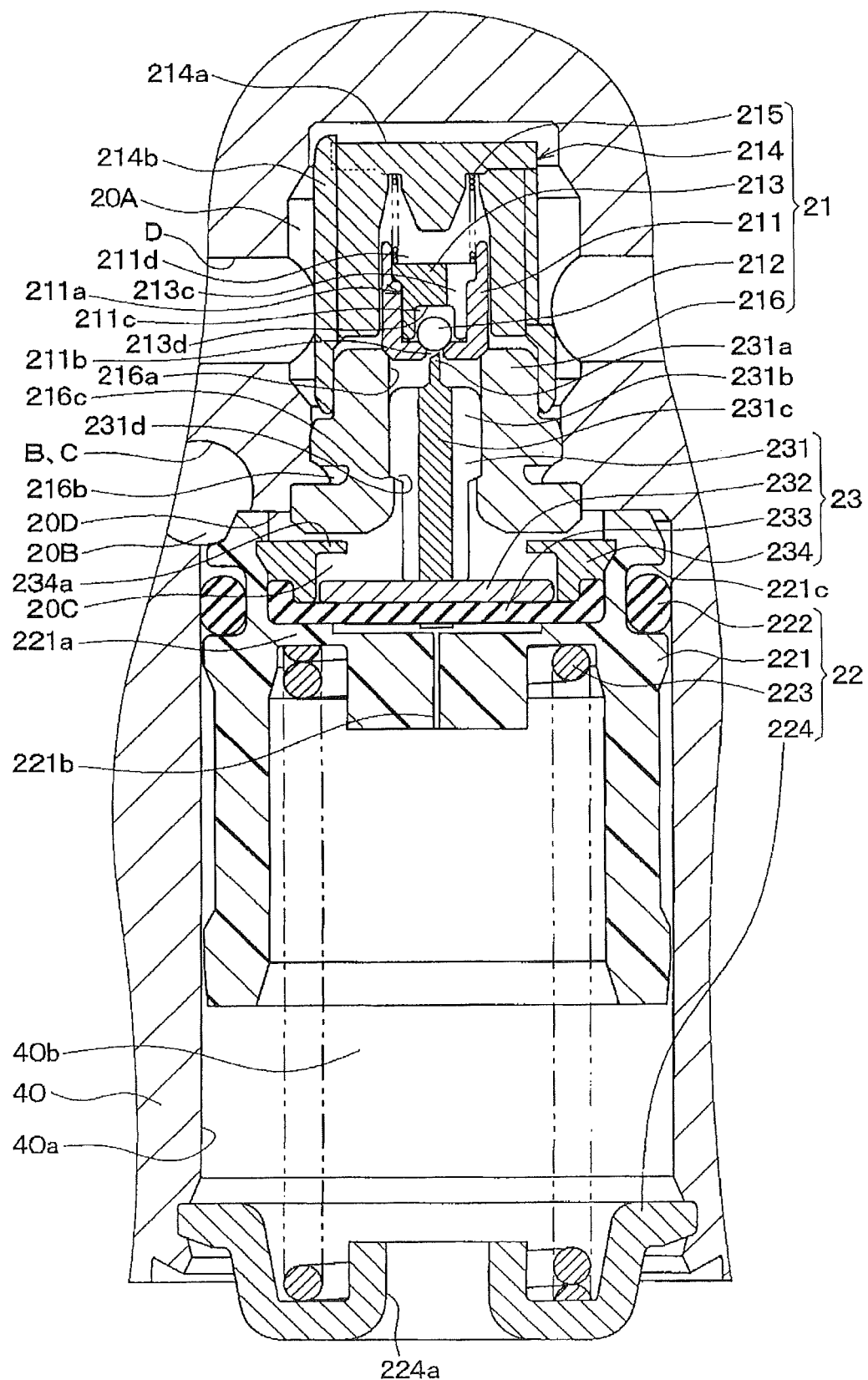
FIG. 8 is a cross-sectional diagram illustrating a pressure regulating reservoir according to a fourth embodiment.
Figure 9A:
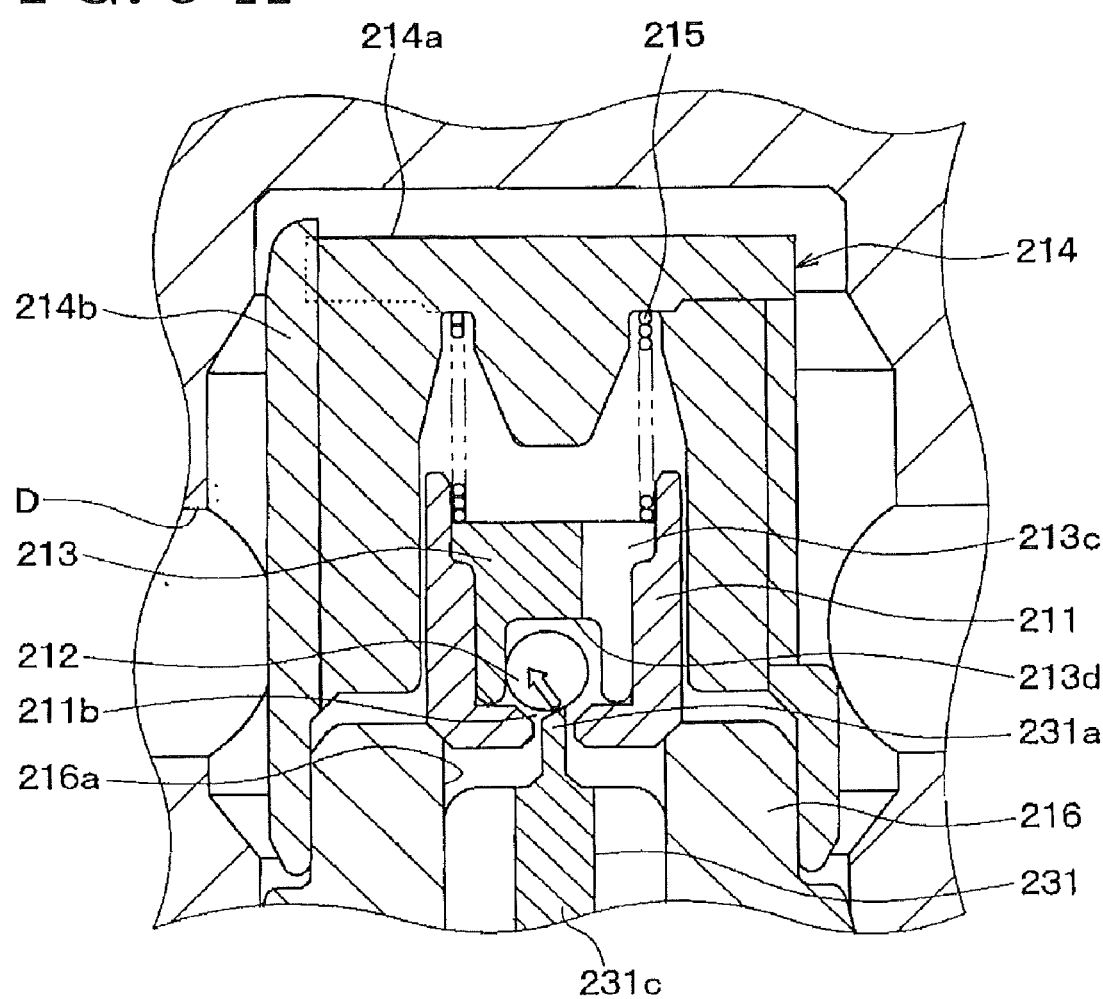
FIG. 9A is an enlarged cross-sectional diagram illustrating a valve and surrounding components of the pressure regulating reservoir.
Figure 9B:
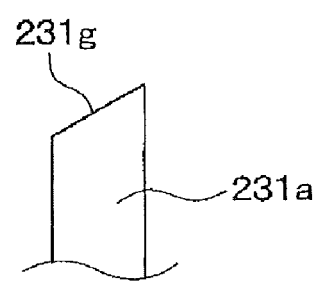
FIG. 9B is an enlarged diagram illustrating a protruding portion of a shaft.
Figure 10:
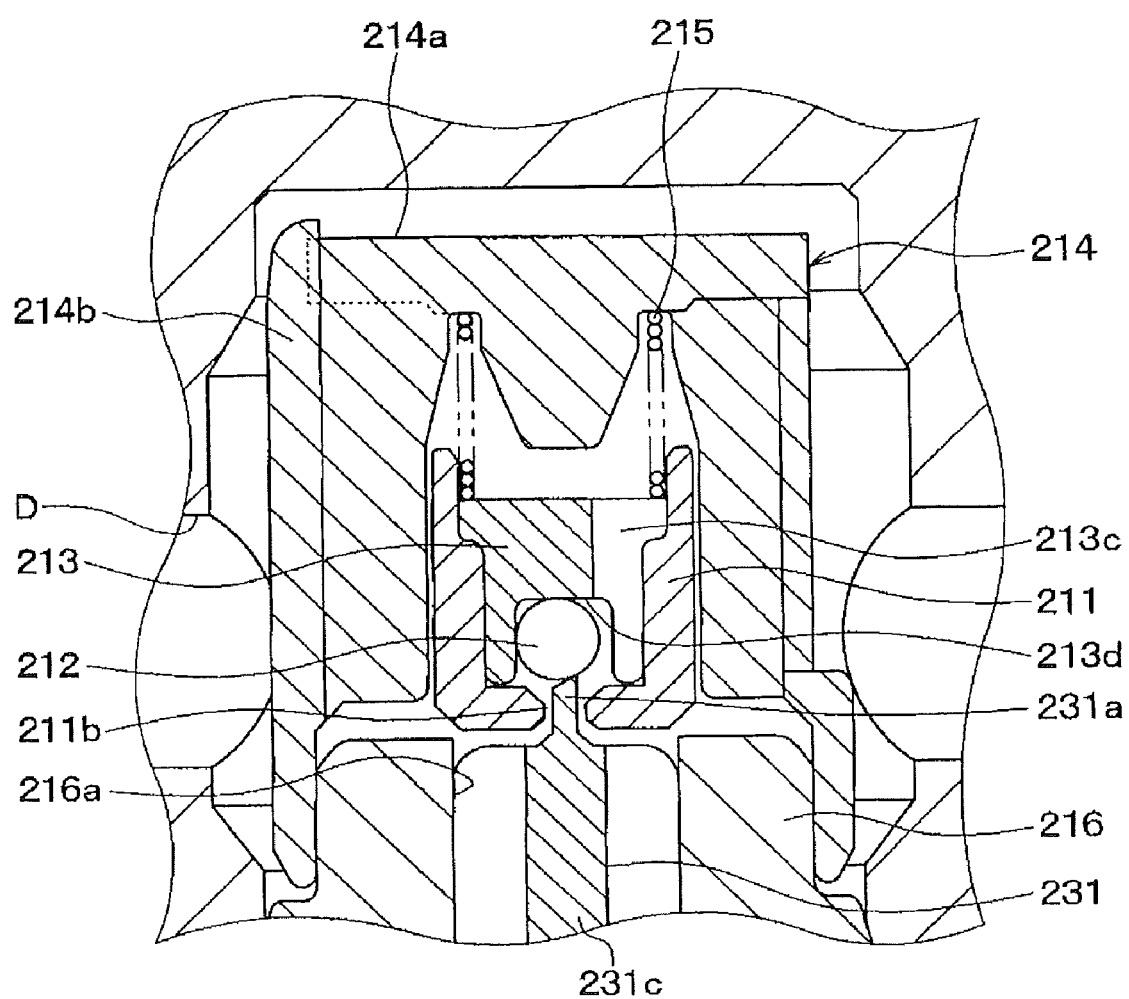
FIG. 10 is an enlarged cross-sectional diagram illustrating the valve and the surrounding components of the pressure regulating reservoir in a case where the shaft is moved further upward comparing to a state illustrated in FIG. 9A.

Illustrated in FIG. 8 is a cross-sectional diagram of the pressure regulating reservoir 20 according to the fourth embodiment. Furthermore, illustrated in FIG. 9A is an enlarged cross-sectional diagram illustrating the valve 211 and the surrounding components of the pressure regulating reservoir 20. Illustrated in FIG. 9B is an enlarged view illustrating the protruding portion 231a of the shaft 231. Illustrated in FIG. 10 is an enlarged cross-sectional diagram illustrating the valve 211 and the surrounding components of the pressure regulating reservoir 20 in a case where the shaft 231 is further upwardly displaced when comparing to a state illustrated in FIG. 9A.

As illustrated in FIGS. 8 and 9, the pressure regulating reservoir 20 of the fourth embodiment differs from the pressure regulating reservoir 20 of the first embodiment in a shape of the pin 213. Furthermore, according to the fourth embodiment, the valve 211 and the pin 213 are integrally formed. More specifically, a positioning of the pin 213 relative to the valve 211 is determined by the pin 213 being fixed on the valve 211 in a manner where the pin 213 is press-fitted against an inner circumferential surface of the valve 211 and an end portion of the pin 213 contacts the stepped portion of the valve 211.

The pin 213 is formed in a column shape having a flange portion at one end portion of the pin 213. Furthermore, a communication passage 213c is formed at the pin 213 so as to extend along the axial direction thereof. Additionally, any desired number of the communication passages 213c may be provided at the pin 213. Furthermore, the communication passage 213c is formed at the pin 213 so that the brake fluid flows through the communication passage 213c. In other words, the brake fluid flow passage is ensured at the valve portion 21 of the pressure regulating reservoir 20 via the communication passage 213c.

A recessed portion 213d for accommodating the ball valve 212 is formed at an end portion of the pin 213 in an insertion direction to the valve 211. A depth of the recessed portion 213d is set so that the ball valve 212 is detached from a base surface of the recessed portion 213d (i.e. a surface of the recessed portion 213d provided so as to opposite from an opening of the recessed portion 213d) while the ball valve 212 seats on the seat surface of the valve 211. Additionally, the depth of the recessed portion 213d is determined so that the lifting amount (a distance) of the ball valve 212 being moved in a direction of detaching the ball valve 212 from the seat surface by being pushed by the protruding portion 231a of the shaft 231 becomes smaller than a distance between the cross-shaped portion 231c of the shaft 231 and the valve 211.

Accordingly, while a normal operation is performed (e.g. while the pump 10 is not actuated), the ball valve 212 seats on the seat surface of the valve 211, so that the ball valve 212 closes the minor hydraulic passage 211b, thereby closing the brake fluid flow passage. On the other hand, when the piston portion 22 is displaced so as to reduce the volume of the reservoir chamber 20C, the ball valve 212 is upwardly pushed by the protruding portion 231a of the shaft 231, thereby detaching the ball valve 212 from the seat surface, as illustrated in FIG. 9A. Then, because the lifting amount of the ball valve 212 is set to be smaller than the distance between the cross-shaped portion 231c and the valve 211, the ball valve 212 contacts the base surface of the recessed portion 213d while the cross-shaped portion 231c does not contact the valve 211, as illustrated in FIG. 10. Accordingly, the pin 213 is displaced in an upward direction in FIG. 10 on the basis of a force, which is upwardly transmitted to the ball valve 212 from the shaft 231, so as to resist against the biasing force of the spring 215. As a result, the valve 211, which is integrally formed with the pin 213, is also displaced, thereby opening the major hydraulic passage 216a.

According to the third embodiment, because the force of pressing the ball valve 212 is not generated at the pin 213 and the ball valve 212 contacts the seat surface of the valve 211 to close the minor hydraulic passage 211b by a weight of the ball valve 212 itself while the normal operation is performed (e.g. while the pump 10 is not actuated), the ball valve 212 is easily detached from the seat surface of the valve 211. In other words, the pressure regulating reservoir 20 of the fourth embodiment is configured so that the ball valve 212 is detached from the seat surface by a relatively weak force when comparing to the first embodiment in which a load is applied to the ball valve 212 in the downward direction by the biasing force of the spring 215 via the pin 213.

Accordingly, when the air is evacuated via the first reservoir port 20A through the conduit D, the negative pressure is generated and the ball valve 212 is easily detached from the seat surface in response to the generation of the negative pressure. Then, the brake apparatus in a vacuum state is filled with the brake fluid (i.e. a vacuum filling of the brake fluid) when the brake apparatus is assembled. On the other hand, according to the first embodiment, the pressure regulating reservoir 20 is configured so that not only is the ball valve 212 pressed against the seat surface of the valve 211 by the spring 215 pressing the pin 214 by using the biasing force, but also the valve 211 is pressed against a seat surface of the valve seat 216. Therefore, according to the first embodiment, the ball valve 212 may not be detached from the seat surface if the sufficient negative pressure is not generated when the air is evacuated from the brake apparatus. On the other hand, according to the fourth embodiment, the brake apparatus may be easily filled with the brake fluid after the air is evacuated therefrom (i.e. the vacuum filling may be easily executed).

Furthermore, according to the fourth embodiment, because the pin 213 and the valve 211 are integrally formed, a force for biasing the pin 213 towards the valve 211, i.e. the basing force of the spring 215 applied to the pin 213 towards the valve 211, does not need to be considered when executing the pressure regulation. The pressure regulating reservoir 20 of the fourth embodiment may be modified so that a spring is provided between the base surface of the recessed portion 213d of the pin 213 and the ball valve 212 so as to press the ball valve 212 towards the seat surface of the valve 211. However, considering easiness of the vacuum filling of the brake fluid and reduction of number of components used for the pressure regulating reservoir 20, the spring may not always need to be provided between the base surface of the recessed portion 213d and the ball valve 212. Furthermore, a position of the ball valve 212 is determined by the pin 213 without providing the spring between the base surface of the recessed portion 213d and the ball valve 212. Accordingly, the ball valve 212 surely seats on and is detached from the seat surface of the valve 211, therefore, the pressure regulating reservoir 20 of the fourth embodiment may not deteriorate a function of the ball valve 212 as the pressure regulating valve.

Furthermore, the pressure regulating reservoir 20 of the fourth embodiment differs from the pressure regulating reservoir 20 of the first embodiment in the shape of the protruding portion 231a of the shaft 231. More specifically, according to the fourth embodiment, a tapered shaped portion 231g is formed at an end portion of the protruding portion 231a so that a surface of the end portion of the protruding portion 231a is inclined relative to the axial direction of the shaft 231. Therefore, when the ball valve 212 is upwardly pushed by the protruding portion 231a in order to detach the ball valve 212 from the seat surface of the valve 211, the ball valve 212 is pressed in a inclined direction relative to the axial direction by the tapered shaped portion 231g (i.e. in a direction indicated by an arrow in FIG. 9A). Accordingly, the ball valve 212 contacts an inner wall surface of a member for accommodating the ball valve 212 by the tapered shaped portion 231g, i.e. the ball valve 212 contacts an inner wall surface of the recessed portion 213d of the pin 213 (i.e. an inner wall surface of the first accommodating portion 211c of the valve 211). As a result, the ball valve 212 is stably positioned within the recessed portion 213d of the pin 213, so that the ball valve 212 may be avoided from oscillating due to the brake fluid flowing through the valve portion 21, and the like.

Furthermore, because a force acts on the ball valve 212 in the inclined direction relative to the axial direction when the ball valve 212 is pressed by the tapered shaped portion 231g of the shaft 231 to open the major hydraulic passage 216a in response to the displacement of the ball valve 212, the valve 211 is indirectly pressed in the inclined direction relative to the axial direction via the ball valve 212. Accordingly, the valve 211 contacts an inner wall surface of a portion for accommodating the valve 211 in response to a lateral force generated in one direction, i.e. the valve 211 contacts a portion of the six column members 241b of the filter component 214 in response to the lateral force generated in the one direction. As a result, the valve 211 is stably positioned and the valve 211 may be avoided from oscillating due to the brake fluid flowing through the valve portion 21, and the like.

According to the pressure regulating reservoir 20 of the fourth embodiment, the pin 213 and the valve 211 are integrally formed, so that the load generated by the spring 215, which biases the valve 211 towards the seat surface of the valve seat 216, is not applied to the ball valve 212. Accordingly, the ball valve 212 is easily detached from the seat surface of the valve seat 216 in response to the negative pressure, which is generated when the air existing within the brake apparatus is evacuated from the first reservoir port 20A through the conduit D. As a result, the brake apparatus in the vacuum state is easily filled with the brake fluid (i.e. the vacuum filling of the brake fluid may easily be executed). More specifically, according to the fourth embodiment, because the pressure regulating reservoir 20 is configured so that the ball valve 212 normally contacts the seat surface of the valve 211 by its own weight, the ball valve 212 is further easily detached from the seat surface of the valve 211 in addition to the advantages and effects described above.

Furthermore, according to the pressure regulating reservoir 20 of the fourth embodiment, the tapered shaped portion 231g is formed at the protruding portion 231a of the shaft 231. Therefore, the ball valve 212 is stably positioned in the case where the ball valve 212 is detached from the seat surface of the valve 211 by the protruding portion 231a. Accordingly, the ball valve 212 is avoided from oscillating due to the flow of the brake fluid and the like.

Fifth Embodiment

A fifth embodiment of a pressure regulating reservoir will be described below. The pressure regulating reservoir 20 of the fifth embodiment differs from the pressure regulating reservoir 20 of the fourth embodiment in the shape of the shaft 231. On the other hand, other configurations of the brake apparatus of the fifth embodiment are similar to that of the brake apparatus. Therefore, only the pressure regulating reservoir 20 will be described in the fifth embodiment.

Figure 11:
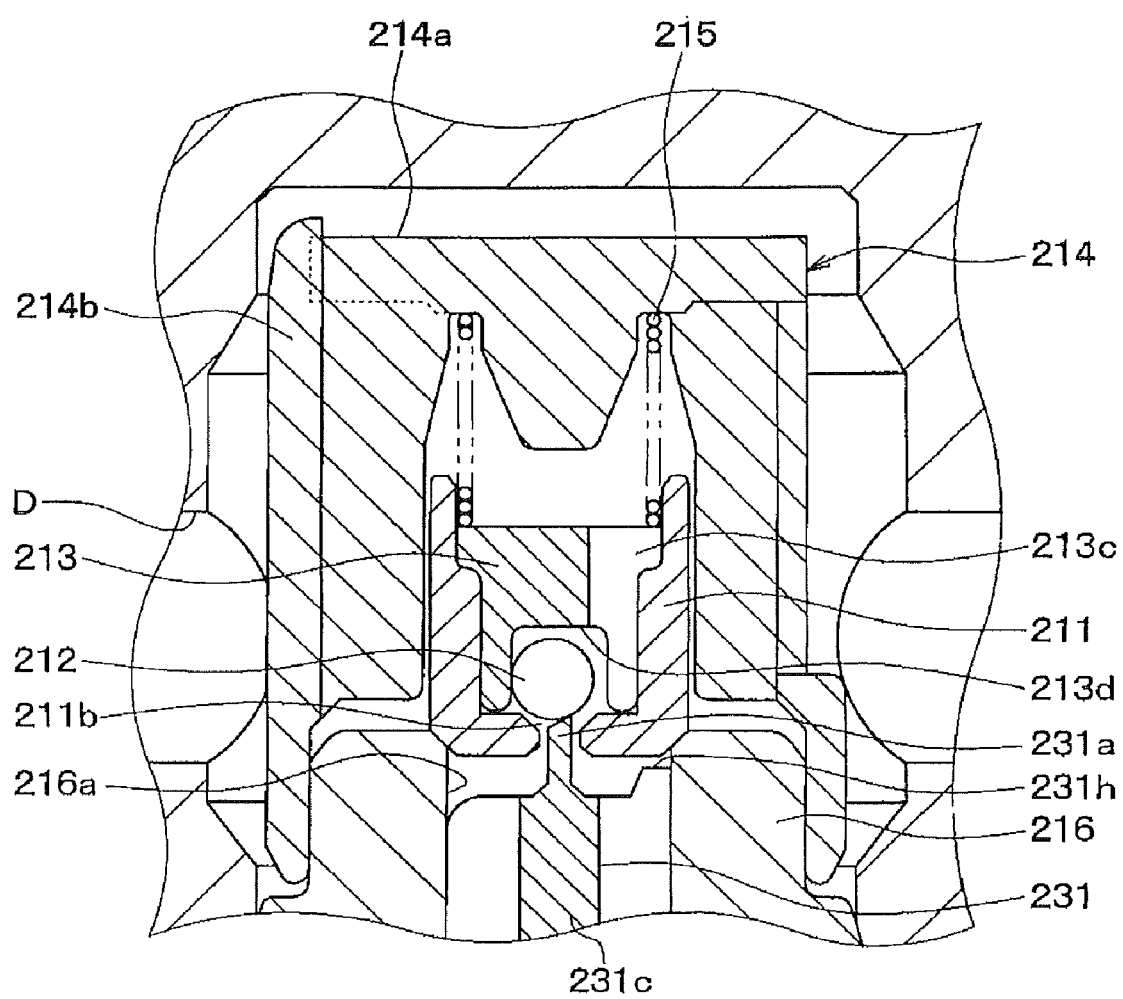
FIG. 11 is an enlarged cross-sectional diagram illustrating a valve and surrounding components of a pressure regulating reservoir according to a fifth embodiment.
Figure 12:
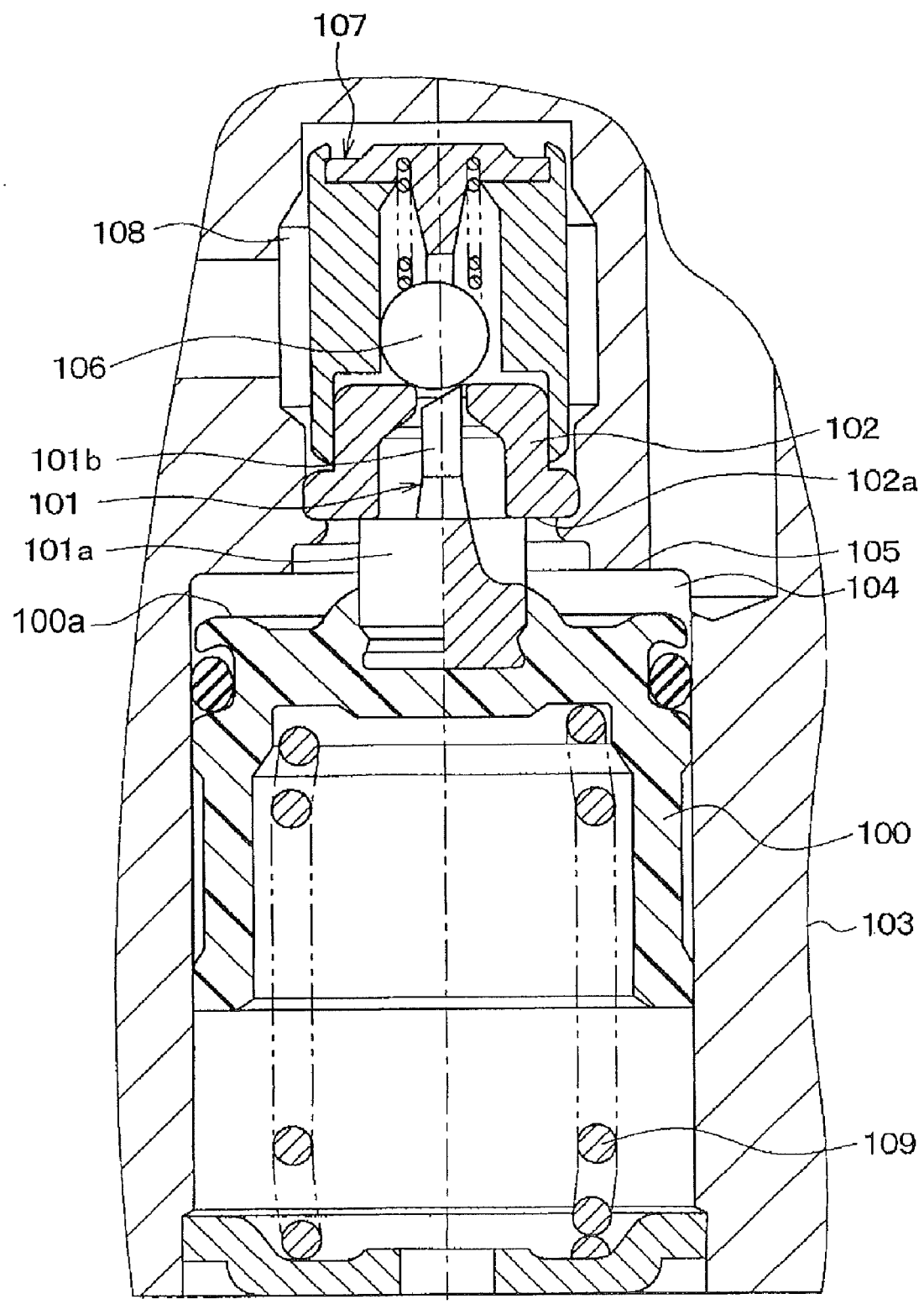
FIG. 12 is a cross-sectional diagram of a pressure regulating reservoir according to a known art.

Illustrated in FIG. 11 is an enlarged cross-sectional diagram illustrating the valve 211 and the surrounding components of the pressure regulating reservoir 20 according to the fifth embodiment. As illustrated in FIG. 11, the pressure regulating reservoir 20 of the fifth embodiment is configured so that the shaft 231 includes a projecting portion 231h at a surface thereof facing the valve 211. More specifically, the projecting portion 231h is provided at an upper end surface of the cross-shaped portion 231c. Furthermore, the projecting portion 231h is provided at the upper end surface of the cross-shaped portion 231c so as to be away from the center axis of the shaft 231. According to the fifth embodiment, when the piston portion 22 is displaced so as to reduce the volume of the reservoir chamber 20C, the ball valve 212 is pushed by the protruding portion 231a of the shaft 231 so as to be detached from the seat surface of the valve 211. Then, the projecting portion 231h directly contacts a lower surface of the valve 211 facing the shaft 231, so that the force generated in the inclined direction relative to a moving direction of the shaft 231 (i.e. the axial direction of the shaft 231) is applied to the valve 211. As a result, the valve 211 is displaced in the upward direction in FIG. 11 in response to the force applied thereto.

According to the fifth embodiment, the force in the inclined direction relative to the axial direction is directly applied to the valve 211 by the projecting portion 231h in the case where the valve 211 is detached from the seat surface of the valve seat 216. More specifically, the load is applied to the valve 211 in a direction from the projecting portion 231h towards the opposite side therefrom relative to the center axis of the shaft 231. Accordingly, the valve 211 firmly contacts the inner wall surface of the member for accommodating the valve 211, i.e. a portion of the six column members 214b of the filter component 214, with receiving relatively large lateral force. As a result, the valve 211 is stably positioned and chances of the valve 211 oscillating due to the flow of the brake fluid may be reduced.

In the case where the load is applied to the valve 211 in the inclined direction by the projecting portion 231h, the load may be easily applied to the valve 211 when using the lower surface of the valve 211. For example, in a case where an outer edge portion of the lower surface of the valve 211 is formed in a tapered shape or in a case where the lower surface of the valve 211 is processed to have a spherical surface, so that the projecting portion 231h of the shaft 231 contacts the inclination of the lower surface of the valve 211, the load is easily applied to the valve 211 in the inclined direction.

According to the pressure regulating reservoir 20 of the fifth embodiment, the projecting portion 231h is provided at the surface of the shaft 231 facing the valve 211. Accordingly, the load is applied to the valve 211 in the inclined direction by the projecting portion 231h when the valve 211 is detached from the seat surface of the valve seat 216. As a result, as described above, the chances of the valve 211 oscillating due to the flow of the brake fluid and the like may be reduced.

Other Embodiments

According to the first embodiment, the shaft 231 and the plate 232 are separately formed. On the other hand, according to the second embodiment, the piston 211 and the shaft 231 are separately formed. Further, according to the third embodiment, the minor piston portion 25 is formed separately from the shaft 231. However, the pressure regulating reservoir 20 may be modified so that the shaft 231 and the plate 232, the piston 221 and the shaft 231, and the minor piston portion 25 and the shaft 231, are integrally formed. In the case where the shaft 231 is integrally formed with the plate 23, where the shaft 231 is integrally formed with the piston 211 or in the case where the shaft 231 is integrally formed with the piston portion 25, the shaft 231 may be restricted from being inclined relative to the axial direction. Therefore, the pressure regulating reservoir 20 may be modified so that the diameter of the shaft 231 is set to be narrower than the diameter of the major hydraulic passage 216a without providing the slits 231b on the shaft 231.

According to the above-described embodiments, configuration examples of the valve portion 21 are described. However, the valve portion 21 may be modified to have any desired configuration as long as the valve portion 21 includes a valve body, which is configured with the valve 211 having the minor hydraulic passage 211b at the inner portion thereof, the ball valve 212 for closing the minor hydraulic passage 211b and the like, and as long as the valve 211 serves also as a valve body of the major hydraulic passage 216a.

Furthermore, according to the second embodiment, the spring deformation restricting portion 24 is configured with the retainer 241 and the rod 242. However, the spring deformation restricting portion 24 may be modified so as to restrict the deformation (stretch) of the spring 223 to a predetermined amount while allowing the compression of the spring 223. For example, a retainer, which is formed in a cylindrical shape and includes a flange portion at each end portion thereof, may be used as the spring deformation restricting portion 24.

Furthermore, according to the third embodiment, the shaft 231 is biased towards the minor piston portion 25, which serves as the mobile member, by the return spring portion 26. However, the return spring portion 26 may be adapted to the pressure regulating reservoir 20 of the first and second embodiments, so that the shaft 231 is biased towards the plate 232 and the cup 233, or towards the piston 221, which serve as the mobile member, by the return spring portion 26.

Still further, according to the fourth and fifth embodiments, the modification examples of the pin 213 of the first embodiment are described. However, similar modifications may be made to the pressure regulating reservoir 20 of the second and third embodiments. Accordingly, the pressure regulating reservoir 20 of the second and third embodiments may achieve similar advantages and effects described in the fourth and fifth embodiments.

Accordingly, the minor hydraulic passage 211b and the major hydraulic passage 216a are closed in the case where the normal brake operation is performed. As a result, the valve portion 21 is closed (i.e. the valve closed state is established at the valve portion 21) in the case where the normal brake operation is performed, thereby avoiding the brake fluid from being unnecessarily used at the pressure regulating reservoir 20. Furthermore, only the minor hydraulic passage 211b is opened while the pressure regulation (i.e. the pressure modulation) is executed. As a result, the pressure regulating reservoir 20 of the above-described embodiments properly exerts the pressure regulating action. On the other hand, in the case where the self-suction of the brake fluid is executed by the pump 10, the major hydraulic passage 216a is opened, thereby enlarging the inlet diameter of the pressure regulating reservoir 20. As a result, the responsiveness while the brake hydraulic pressure control is executed may be improved.

According to the embodiments, the minor hydraulic passage 211b is formed at the valve 211 and the protruding portion 231a is provided at the shaft 231. The minor hydraulic passage 211b is opened to establish the fluid communication in the case where the protruding portion 231a pushes the ball valve 212 while the protruding portion 231a is inserted into the minor hydraulic passage 211b. Furthermore, the major hydraulic passage 216a is opened to establish the fluid communication in the case where the valve 211 is pushed by the shaft 231 while the minor hydraulic passage 211b is opened.

According to the fifth embodiment, the shaft 231 includes the projecting portion 231h for applying the force to the valve 211 in the inclined direction relative to the moving direction of the shaft 231 by the projecting portion 231h directly contacting the valve 211, so that the projecting portion 231h allows the valve 211 to contact the inner wall surface of the member for accommodating therein the valve 211.

Accordingly, because the projecting portion 231h is provided at the shaft 231, the valve 211 contacts the inner wall surface of the member for accommodating therein the valve 211 when the valve 211 is displaced by the projecting portion 231h. As a result, the valve 211 is stably positioned and the chances of the valve 211 oscillating due to the flow of the brake fluid and the like may be reduced.

According to the fourth and fifth embodiments, the minor hydraulic passage 211b is formed at the valve 211 and the protruding portion 231a is provided at the shaft 231. The minor hydraulic passage 211b is opened to establish the fluid communication in the case where the protruding portion 231a pushes the ball valve 212 while the protruding portion 231a is inserted into the minor hydraulic passage 211b. Furthermore, the major hydraulic passage 216a is opened to establish the fluid communication in the case where the protruding portion 231a of the shaft 231 indirectly presses the valve 211 via the ball valve 212 while the minor hydraulic passage 211b is opened.

According to the fourth and fifth embodiments, the tapered shaped portion 231g is formed at the end portion of the protruding portion 231a, so that the tapered shaped portion 231g presses the ball valve 212 against the inner wall surface of the member for accommodating therein the ball valve 212 in the case where the ball valve 212 is pushed by the protruding portion 231a.

Accordingly, because the tapered shaped portion 231g is formed at the protruding portion 231a, the ball valve 212 may be pushed in the inclined direction by the tapered shaped portion 231g in response to the displacement of the ball valve 212 by the protruding portion 231a. As a result, the ball valve 212 is stably positioned and the chances of the ball valve 212 oscillating due to the flow of the brake fluid and the like may be reduced.

According to the fourth and fifth embodiments, the minor hydraulic passage 211b is formed at the valve 211 and the protruding portion 231a is provided at the shaft 231. In the case where the major hydraulic passage 216a is opened to establish the fluid communication in response to the displacement of the valve 211, the valve 211 is indirectly pressed by the protruding portion 231a via the ball valve 212, which is pressed against the inner wall surface of the member for accommodating therein the ball valve 212 by the tapered shaped portion 231g of the protruding portion 231a, and the valve 211 contacts the inner wall surface of the member for accommodating therein the valve 211.

Accordingly, the valve 211 is indirectly pressed in the inclined direction via the ball valve 212 in the case where the major hydraulic passage 216a is opened in response to the displacement of the valve 211 to establish the fluid communication, because the force is applied to the ball valve 212 in the inclined direction by the tapered shaped portion 231g. Accordingly, the valve 211 contacts the inner wall surface of the member for accommodating therein the valve 211. As a result, the valve 211 is stably positioned and the chances of the valve 211 oscillating due to the flow of the brake fluid and the like may be reduced.

According to the first, fourth and fifth embodiments, the mobile member includes the cup 233, which is deformed in response to the pressure difference generated between the reservoir chamber 20C and the opposing chamber 40b, so that the shaft 231 is displaced in response to the deformation of the cup 233.

Accordingly, the pressure regulating reservoir 20 may be modified so that the shaft 231 is displaced in response to the deformation of the diaphragm (i.e. the cup 233).

According to the first, fourth and fifth embodiments, the pressure regulating reservoir 20 includes the piston 221 for supporting the cup 233. The mobile member includes the plate 232 for displacing the shaft 231 in response to the deformation of the cup 233, and the piston 221 includes the stopper 234 for restricting the displacement of the plate 232 and the deformation of the cup 233 towards the shaft 231.

Accordingly, the diaphragm (i.e. the cup 233) is configured so as to be deformed in response to the pressure difference between the pressure generated within the reservoir chamber 20C and the pressure generated within the opposing chamber 40b. In the case where the normal brake operation is performed, the diaphragm is not deformed. Therefore, the shaft 231 is not displaced by the plate 232 and the diaphragm (i.e. the cup 233) and the minor hydraulic passage 211b is closed to interrupt the fluid communication. On the other hand, in the case where the pressure regulation is executed, the diaphragm is deformed and the ball valve 212 is displaced by the protruding portion 231a of the shaft 231 in response to the deformation of the diaphragm. Accordingly, the pressure regulation is executed so as to offset the pressure difference between the brake hydraulic pressure generated by the brake hydraulic pressure generating means (1, 2, 3) and the brake hydraulic pressure generated within the reservoir chamber 20C (i.e. so that the brake hydraulic pressure generated by the brake hydraulic pressure generating means (1, 2, 3) is balanced against the brake hydraulic pressure generated within the reservoir chamber 20C). On the other hand, in the case where the self-suction of the brake fluid is executed by the pump 10, the diaphragm is deformed so as to reach the maximum deformation amount, so that the major hydraulic passage 216a is also opened in order to establish the fluid communication in response to the displacement of the valve 211.

According to the first, fourth and fifth embodiments, the stopper 234 is formed in the ring-shaped member for fixing the outer edge portion of the cup 233 to the piston 221. Furthermore, the stopper 234 includes the flange portion 234a protruding from the inner circumferential surface of the ring-shaped member towards the center point thereof in the radial direction thereof, so that the displacement of the plate 232 towards the shaft 231 is restricted by the flange portion 234a.

According to the first, fourth and fifth embodiments, the stopper 234 fixes the cup 233 to the piston 221 in the snap-fit manner.

According to the third embodiment, the recessed portion 221d is formed at the piston 221 so as to extend along the axial direction thereof. The mobile member is the minor piston portion 25, which is formed so as to have the smaller diameter than the diameter of the piston 221 of the piston portion 22 and which includes the piston 251 provided within the recessed portion 221d and displacing the shaft 231 in response to the slide movement of the piston 251 within the recessed portion 221d.

Accordingly, the piston 251 of the minor piston portion 25 is displaced in response to the pressure difference generated between the reservoir chamber 20C and the opposing chamber 40b. In the case where the normal brake operation is performed, the piston 251 of the minor piston portion 25 is not displaced and therefore, the shaft 231 is not displaced. Accordingly, the minor hydraulic passage 211b is closed to interrupt the fluid communication. On the other hand, in the case where the pressure regulation is executed, the piston 251 of the minor piston portion 25 is displaced and the ball valve 212 is displaced by the protruding portion 231a of the shaft 231, so that the brake hydraulic pressure generated by the brake fluid pressure generating means (1, 2, 3) is balanced against the brake hydraulic pressure generated within the reservoir chamber 20C (i.e. so that the pressure difference between the brake hydraulic passage generated by the brake fluid pressure generating means (1, 2, 3) and the brake hydraulic pressure generated within the reservoir chamber 20C is offset). Furthermore, in the case where the self-suction of the brake fluid is executed by the pump 10, the piston 251 of the minor piston portion 25 is displaced until the displacement (an amount of displacement) of the piston 251 reaches the maximum level, and the valve 211 is displaced by the shaft 231 in response to the displacement of the piston 251. Accordingly, the major hydraulic passage 216a is also opened to establish the fluid communication.

According to the third embodiment, the pressure regulating reservoir 20 further includes the return spring portion 26 for biasing the shaft 231 towards the minor piston portion 25.

Accordingly, because the pressure regulating reservoir 20 includes the return spring portion 26, the shaft 231 is biased towards the minor piston portion 25 by the return spring portion 26. As a result, in the case where the negative pressure is not generated within the reservoir chamber 20C, the protruding portion 231a of the shaft 231 is positioned away from the ball valve 212.

Accordingly, the minor hydraulic passage 211b and the major hydraulic passage 216a are closed in the case where the normal brake operation is performed. Therefore, the valve portion 21 is closed (i.e. the valve closed state is established at the valve portion 21) while the normal brake operation is performed, so that that the brake fluid may be avoided from being unnecessarily used at the pressure regulating reservoir 20. On the other hand, in the case where the pressure regulation is executed, only the minor hydraulic passage 211b is opened, so that the pressure regulating reservoir 20 properly exerts the pressure regulating action. Still further, in the case where the self-suction of the brake fluid is executed by the pump 10, the major hydraulic passage 216a is opened, thereby enlarging the inlet diameter of the pressure regulating reservoir 20. Accordingly, the responsiveness of the brake hydraulic pressure control may be improved.

According to the embodiments, the minor hydraulic passage 211b is formed at the valve 211 and the protruding portion 231a is provided at the shaft 231. The minor hydraulic passage 211b is opened to establish the fluid communication in the case where the protruding portion 231a pushes the ball valve 212 while the protruding portion 231a is inserted into the minor hydraulic passage 211b. Furthermore, the major hydraulic passage 216a is opened to establish the fluid communication in the case where the valve 211 is pushed by the shaft 231 while the minor hydraulic passage 211b is opened.

According to the fifth embodiment, the shaft 231 includes the projecting portion 231h for applying the force to the valve 211 in the inclined direction relative to the moving direction of the shaft 231 by the projecting portion 231h directly contacting the valve 211, so that the projecting portion 231h allows the valve 211 to contact the inner wall surface of the member for accommodating therein the valve 211.

Accordingly, because the projecting portion 231h is provided at the shaft 231, the valve 211 contacts the inner wall surface of the member for accommodating therein the valve

211 when the valve 211 is displaced by the projecting portion 231h. As a result, the valve 211 is stably positioned and the chances of the valve 211 oscillating due to the flow of the brake fluid and the like may be reduced.

According to the fourth and fifth embodiments, the minor hydraulic passage 211b is formed at the valve 211 and the protruding portion 231a is provided at the shaft 231. The minor hydraulic passage 211b is opened to establish the fluid communication in the case where the protruding portion 231a pushes the ball valve 212 while the protruding portion 231a is inserted into the minor hydraulic passage 211b. Furthermore, the major hydraulic passage 216a is opened to establish the fluid communication in the case where the protruding portion 231a of the shaft 231 indirectly presses the valve 211 via the ball valve 212 while the minor hydraulic passage 211b is opened.

According to the fourth and fifth embodiments, the tapered shaped portion 231g is formed at the end portion of the protruding portion 231a, so that the tapered shaped portion 231g presses the ball valve 212 against the inner wall surface of the member for accommodating therein the ball valve 212 in the case where the ball valve 212 is pushed by the protruding portion 231a.

Accordingly, because the tapered shaped portion 231g is formed at the protruding portion 231a, the ball valve 212 may be pushed in the inclined direction by the tapered shaped portion 231g in response to the displacement of the ball valve 212 by the protruding portion 231a. As a result, the ball valve 212 is stably positioned and the chances of the ball valve 212 oscillating due to the flow of the brake fluid and the like may be reduced.

According to the fourth and fifth embodiments, the minor hydraulic passage 211b is formed at the valve 211 and the protruding portion 231a is provided at the shaft 231. In the case where the major hydraulic passage 216a is opened to establish the fluid communication in response to the displacement of the valve 211, the valve 211 is indirectly pressed by the protruding portion 231a via the ball valve 212, which is pressed against the inner wall surface of the member for accommodating therein the ball valve 212 by the tapered shaped portion 231g of the protruding portion 231a, and the valve 211 contacts the inner wall surface of the member for accommodating therein the valve 211.

Accordingly, the valve 211 is indirectly pressed in the inclined direction via the ball valve 212 in the case where the major hydraulic passage 216a is opened in response to the displacement of the valve 211 to establish the fluid communication, because the force is applied to the ball valve 212 in the inclined direction by the tapered shaped portion 231g. Accordingly, the valve 211 contacts the inner wall surface of the member for accommodating therein the valve 211. As a result, the valve 211 is stably positioned and the chances of the valve 211 oscillating due to the flow of the brake fluid and the like may be reduced.

According to the second embodiment, the spring deformation restricting portion 24 includes the first retainer 241a, which includes the flange portion contacting one end portion of the spring 223, the second retainer 241b, which includes the flange portion contacting the other end portion of the spring 223, and a rod 242 connecting the first and second retainers 241a and 241b in order to restrict the maximum distance therebetween while allowing the first and second retainers 241a and 241b to move relative to each other.

According to the embodiments, the slit 231b is formed at the shaft 231 so as to extend in the axial direction thereof, so that the brake fluid flows through the major hydraulic passage 216a via the slit 231b.

According to the embodiments, the first stepped portion 216c is formed at the inner wall surface of the valve seat 216 defining the major hydraulic passage 216a. The second stepped portion 231d is formed at the outer circumferential surface of the shaft 231. Accordingly, the displacement of the shaft 231 towards the mobile member is restricted by the first stepped portion 216c and the second stepped portion 231d.

Accordingly, because the distance between the stepped portion 216c of the valve seat 216 and the upper end surface of the valve seat 216 is set to be constant, and further, because the distance between the stepped portion 231d of the shaft 231 and the protruding portion 231a thereof is set to be constant, the positional relationship between the protruding portion 231a of the shaft 231 and the ball valve 212 is automatically determined. As a result, the lifting amount of the ball valve 212 is easily controlled.

According to the embodiments, the ball valve 212 closes the minor hydraulic passage 211b by the weight of the ball valve 212 in order to interrupt the fluid communication.

Accordingly, because the ball valve 212 closes the minor hydraulic passage 211b by its own weight, the ball valve 212 is easily displaced in order to open the minor hydraulic passage 211b. As a result, the ball valve 212 is easily displaced in response to the negative pressure, which is generated when the air is evacuated from the brake apparatus via the first reservoir portion 20A, thereby opening the minor hydraulic passage 211b and filling the brake apparatus with the brake fluid further easily.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A pressure regulating reservoir comprising:
   a housing;
   a first conduit provided at the housing and connecting a main conduit and the pressure regulating reservoir, the main conduit connecting a brake hydraulic pressure generating means for generating a brake hydraulic pressure in response to an operation of a brake operation member and a wheel braking force generating means for generating a braking force relative to a wheel;
   a second conduit provided at the housing and connecting the main conduit and the pressure regulating reservoir in order to allow the brake hydraulic pressure to be transmitted from the brake hydraulic pressure generating means to the pressure regulating reservoir through the second conduit;
   a reservoir chamber formed at the housing, connected to the first conduit and the second conduit, storing therein a brake fluid, and connected to an inlet port of a pump for sucking the brake fluid stored within the reservoir chamber;
   a first reservoir port connecting the reservoir chamber and the second conduit;
   a second reservoir port connecting the reservoir chamber and the first conduit;
   a valve portion provided at the first reservoir port and including a first hydraulic passage for allowing the brake fluid to flow therethrough from the second conduit to the reservoir chamber, a first valve body, a second valve body for closing the first hydraulic passage and a valve seat at which a second hydraulic passage, which has a larger passage area than the first hydraulic passage and which is to be closed by the first valve body, is formed;

a piston portion including a piston for changing a volume of the reservoir chamber and a spring, which is disposed at the piston portion at a portion opposite from the reservoir chamber relative to the piston so as to bias the piston in a direction of reducing the volume of the reservoir chamber;

a mobile member being displaceable in response to a pressure difference generated between the reservoir chamber and an opposing chamber, which is positioned so as to be adjacent to the reservoir chamber, in order to change a distance between the first valve body and the mobile member;

a protruding portion for displacing the second valve body in response to a displacement of the mobile member in order to open the first hydraulic passage to establish a fluid communication; and a shaft for opening the second hydraulic passage by displacing the first valve body after the second valve body is displaced by the protruding portion, wherein in a case where the pump is not actuated, no displacement of the mobile portion occurs and the protruding portion is positioned away from the second valve body, so that the first hydraulic passage is closed by the second valve body thereby interrupting the fluid communication, in a case where the pump is actuated while the brake hydraulic pressure is generated by the brake hydraulic pressure generating means, the mobile member is displaced and the protruding portion displaces the second valve body, so that the pressure difference between the brake hydraulic pressure generated within the reservoir chamber and the brake hydraulic pressure generated within the first reservoir port is regulated; and in a case where the pump is actuated while no brake hydraulic pressure is generated by the brake hydraulic pressure generating means, the mobile member is further displaced and the shaft displaces the first valve body, so that the second hydraulic passage is opened to establish the fluid communication.

2. The pressure regulating reservoir according to claim 1, wherein the first hydraulic passage is formed at the first valve body, the protruding portion is provided at the shaft, the first hydraulic passage is opened to establish the fluid communication in a case where the protruding portion pushes the second valve body while the protruding portion is inserted into the first hydraulic passage, and the second hydraulic passage is opened to establish the fluid communication in a case where the first valve body is pushed by the shaft while the first hydraulic passage is opened.

3. The pressure regulating reservoir according to claim 1, wherein the shaft includes a projecting portion for applying a force to the first valve body in an inclined direction relative to a moving direction of the shaft by the projecting portion directly contacting the first valve body, so that the projecting portion allows the first valve body to contact an inner wall surface of a member for accommodating therein the first valve body.

4. The pressure regulating reservoir according to claim 1, wherein the first hydraulic passage is formed at the first valve body, the protruding portion is provided at the shaft, the first hydraulic passage is opened to establish the fluid communication in a case where the protruding portion pushes the second valve body while the protruding portion is inserted into the first hydraulic passage, and the second hydraulic passage is opened to establish the fluid communication in a case where the protruding portion of the shaft indirectly presses the first valve body via the second valve body while the first hydraulic passage is opened.

5. The pressure regulating reservoir according to claim 1, wherein a tapered shaped portion is formed at an end portion of the protruding portion, so that the tapered shaped portion presses the second valve body against an inner wall surface of the member for accommodating therein the second valve body in a case where the second valve body is pushed by the protruding portion.

6. The pressure regulating reservoir according to claim 5, wherein the first hydraulic passage is formed at the first valve body, the protruding portion is provided at the shaft, and wherein in the case where the second hydraulic passage is opened to establish the fluid communication in response to a displacement of the first valve body, the first valve body is indirectly pressed by the protruding portion via the second valve body, which is pressed against the inner wall surface of the member for accommodating therein the second valve body by the tapered shaped portion of the protruding portion, and the first valve body contacts the inner wall surface of the member for accommodating therein the first valve body.

7. The pressure regulating reservoir according to claim 1, wherein the mobile member includes a diaphragm, the diaphragm is deformed in response to the pressure difference generated between the reservoir chamber and the opposing chamber, so that the shaft is displaced in response to a deformation of the diaphragm.

8. The pressure regulating reservoir according to claim 7 further comprising a supporting member for supporting the diaphragm, wherein the mobile member includes a plate for displacing the shaft in response to the deformation of the diaphragm, and the supporting member includes a stopper for restricting a displacement of the plate and the deformation of the diaphragm towards the shaft.

9. The pressure regulating reservoir according to claim 8, wherein the stopper is formed in a ring-shaped member for fixing an outer edge portion of the diaphragm to the supporting member and the stopper includes a flange portion protruding from an inner circumferential surface of the ring-shaped member towards a center point thereof in a radial direction thereof, so that the displacement of the plate towards the shaft is restricted by the flange portion.

10. The pressure regulating reservoir according to claim 9, wherein the stopper fixes the diaphragm to the supporting member in a snap-fit manner.

11. The pressure regulating reservoir according to claim 1, wherein a recessed portion is formed at the piston so as to extend along an axial direction thereof, and wherein the mobile member is a minor piston portion, which is formed so as to have a smaller diameter than a diameter of the piston of the piston portion and which includes a piston provided within the recessed portion and displacing the shaft in response to a slide movement of the piston within the recessed portion.

12. The pressure regulating reservoir according to claim 1 further comprising a return spring portion for biasing the shaft towards the mobile member.

13. The pressure regulating reservoir according to claim 1, wherein a slit is formed at the shaft so as to extend in an axial direction thereof, so that the brake fluid flows through the second hydraulic passage via the slit.

14. The pressure regulating reservoir according to claim 1, wherein a first stepped portion is formed at an inner wall surface of the valve seat defining the second hydraulic passage and a second stepped portion is formed at an outer circumferential surface of the shaft, so that a displacement of the shaft towards the mobile member is restricted by the first stepped portion and the second stepped portion.

15. The pressure regulating reservoir according to claim 1, wherein the second valve body closes the first hydraulic passage by a weight of the second valve body in order to interrupt the fluid communication.

16. A pressure regulating reservoir comprising:
a housing;
a first conduit provided at the housing and connecting a main conduit and the pressure regulating reservoir, the main conduit connecting a brake hydraulic pressure generating means for generating a brake hydraulic pressure in response to an operation of a brake operation member and a wheel braking force generating means for generating a braking force relative to a wheel;
a second conduit provided at the housing and connecting the main conduit and the pressure regulating reservoir in order to allow the brake hydraulic pressure to be transmitted from the brake hydraulic pressure generating means to the pressure regulating reservoir through the second conduit;
a reservoir chamber formed at the housing, connected to the first conduit and the second conduit, storing a brake fluid, and connected to an inlet port of a pump for sucking the brake fluid stored at the reservoir chamber;
a first reservoir port connecting the reservoir chamber and the second conduit;
a second reservoir port connecting the reservoir chamber and the first conduit;
a valve portion provided at the first reservoir port and including a first hydraulic passage for allowing the brake fluid to flow therethrough from the second conduit to the reservoir chamber, a first valve body, a second valve body for closing the first hydraulic passage and a valve seat at which a second hydraulic passage, which has a larger passage area than the first hydraulic passage and which is to be closed by the first valve body, is formed;
a piston portion including a piston for changing a volume of the reservoir chamber and a spring, which is disposed at the piston portion at a portion opposite from the reservoir chamber relative to the piston so as to bias the piston in a direction of reducing the volume of the reservoir chamber;
a spring deformation restricting portion for restricting a stretch of the spring;
a protruding portion for displacing the second valve body in response to a displacement of the piston in order to open the first hydraulic passage to establish a fluid communication; and
a shaft for opening the second hydraulic passage by displacing the first valve body after the second valve body is displaced by the protruding portion, wherein
in a case where the pump is not actuated, the piston is positioned so as to be closer to the spring and the protruding portion is positioned away from the second valve body, so that the first hydraulic passage is closed by the second valve body to interrupt the fluid communication,
in a case where the pump is actuated while the brake hydraulic pressure is generated by the brake hydraulic pressure generating means, the piston is displaced in the direction of reducing the volume of the reservoir chamber, so that the pressure difference between the brake hydraulic pressure generated within the reservoir chamber and the brake hydraulic pressure generated within the first reservoir port is regulated by the protruding portion displacing the second valve body; and
in a case where the pump is actuated while the brake hydraulic pressure is not generated by the brake hydraulic pressure generating means, the piston is further displaced in the direction of reducing the volume of the reservoir chamber and the shaft displaces the first valve body, so that the second hydraulic passage is opened to establish the fluid communication.

17. The pressure regulating reservoir according to claim 16, wherein the first hydraulic passage is formed at the first valve body, the protruding portion is provided at the shaft, the first hydraulic passage is opened to establish the fluid communication in a case where the protruding portion pushes the second valve body while the protruding portion is inserted into the first hydraulic passage, the second hydraulic passage is opened to establish the fluid communication in a case where the protruding portion of the shaft indirectly presses the first valve body via the second valve body while the first hydraulic passage is opened, a tapered shaped portion is formed at an end portion of the protruding portion, so that the tapered shaped portion presses the second valve body against an inner wall surface of a member for accommodating therein the second valve body in a case where the second valve body is pushed by the protruding portion, and wherein in the case where the second hydraulic passage is opened to establish the fluid communication in response to a displacement of the first valve body, the first valve body is indirectly pressed by the protruding portion via the second valve body, which is pressed against the inner wall surface of the member for accommodating therein the second valve body by the tapered shaped portion of the protruding portion, and the first valve body contacts the inner wall surface of the member for accommodating therein the first valve body.

18. The pressure regulating reservoir according to claim 16, wherein the spring deformation restricting portion includes a first retainer, which includes a flange portion contacting one end portion of the spring, a second retainer, which includes a flange portion contacting the other end portion of the spring, and a rod connecting the first and second retainers in order to restrict a maximum distance therebetween while allowing the first and second retainers to move relative to each other.

19. The pressure regulating reservoir according to claim 16, wherein a first stepped portion is formed at an inner wall surface of the valve seat defining the second hydraulic passage and a second stepped portion is formed at an outer circumferential surface of the shaft, so that a displacement of the shaft towards the mobile member is restricted by the first stepped portion and the second stepped portion.

20. The pressure regulating reservoir according to claim 16, wherein the second valve body closes the first hydraulic passage by a weight of the second valve body in order to interrupt the fluid communication.

* * * * *